(12) United States Patent  
Takatsuka et al.

(10) Patent No.: US 8,296,365 B2
(45) Date of Patent: Oct. 23, 2012

(54) COMMUNICATION SYSTEM, COMPUTER PROGRAM EXECUTION DEVICE, RECORDING MEDIUM, COMPUTER PROGRAM, PROGRAM INFORMATION SUPPLY METHOD, AND PROGRAM INFORMATION EDITING METHOD

(75) Inventors: Susumu Takatsuka, Tokyo (JP); Satoru Miyaki, Tokyo (JP); Shingo Matsumoto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 3034 days.

(21) Appl. No.: 09/919,356

(22) Filed: Jul. 31, 2001

(65) Prior Publication Data

US 2002/0038345 A1 Mar. 28, 2002

(30) Foreign Application Priority Data

Aug. 1, 2000 (JP) ................................ 2000-232910
Jan. 24, 2001 (JP) ................................ 2001-016219
Jul. 23, 2001 (JP) ................................ 2001-221948

(51) Int. Cl.
*G06F 15/16* (2006.01)
(52) U.S. Cl. ........................................ 709/205; 709/203
(58) Field of Classification Search .................. None
See application file for complete search history.

(56) References Cited

U.S. PATENT DOCUMENTS 6,064,383 A * 5/2000 Skelly ............................ 715/758
6,106,399 A 8/2000 Baker et al.
6,332,143 B1 * 12/2001 Chase ............................ 707/100
6,658,377 B1 * 12/2003 Anward et al. .................... 704/9
6,810,528 B1 * 10/2004 Chatani ........................ 725/109

FOREIGN PATENT DOCUMENTS

| EP | 0 581 722 | 2/1994 |
|---|---|---|
| EP | 0 753 835 | 1/1997 |
| JP | 04-047435 | 2/1992 |
| JP | 09-083655 | 3/1997 |
| JP | 10-174082 | 6/1998 |
| JP | 11-088863 | 3/1999 |
| JP | 11-238019 | 8/1999 |
| JP | 2000-099225 | 4/2000 |
| WO | 00/01154 | 1/2000 |

OTHER PUBLICATIONS

PC: EverQuest game info; release date Mar. 16, 1999. (www.gamespy.com).*
Japanese Office Action dated Aug. 31, 2004.

(Continued)

*Primary Examiner* — John B. Walsh
(74) *Attorney, Agent, or Firm* — Katten Muchin Rosenman LLP

(57) ABSTRACT

The communication system comprises a first access processing, which accesses a server via a network, receives program information files transmitted from said server, and records them on hard disk, a program production and output that outputs on a monitor a program that it produces by information of received program information files and information recorded on, for example, an optical disk, a system for contributed text editing, which edits, as contributed text, messages input through a controller, a second access processing, which accesses the server at least through the network and transmits contributed texts to said server and an image display, which outputs to the monitor the image data drawn to image memory and displays said image on the screen of said monitor.

5 Claims, 33 Drawing Sheets

OTHER PUBLICATIONS

Atsuya Yoshida, et al. Daily Life Virtual Chat; Study (2) on Human Being and Cyber Space. Nikkey Electronics, $670^{th}$ issue, Nikkey BP Company, issued Sep. 9, 1996, pp. 151-159.

United States Office Action dated Nov. 26, 2004.

Christopher Breen. How it Works: Online Gaming. May 8, 2000 http://www.pcworld.com/howto/article/0.aod.16589.00.asp.

* cited by examiner

PRESENT POINTS TABLE

| | USER ID | USER NAME | PRESENT POINTS |
|---|---|---|---|
| RECORD 0 | USER ID | USER NAME | PRESENT POINTS |
| RECORD 1 | USER ID | USER NAME | PRESENT POINTS |
| RECORD 2 | USER ID | USER NAME | PRESENT POINTS |
| ⋮ | ⋮ | ⋮ | |

FIG. 28

COMMUNICATION SYSTEM, COMPUTER PROGRAM EXECUTION DEVICE, RECORDING MEDIUM, COMPUTER PROGRAM, PROGRAM INFORMATION SUPPLY METHOD, AND PROGRAM INFORMATION EDITING METHOD

FIELD OF THE INVENTION

This invention concerns a communication system by which information is exchanged via a network, a computer program execution device used on the user side in said communication system, a recording medium on which are recorded computer programs and data to be used by said communication system, a computer program itself for realizing said communication system, a method for supplying program information to be transmitted to users via a communication system, and an editing method for said program information.

BACKGROUND OF THE INVENTION

As information devices (entertainment systems) such as entertainment devices that include video game machines, there are those that allow one to play games by manipulating operation devices while causing to be displayed on the screen of a television receiver the content of the game, which is stored on a recording medium such as a CD-ROM.

The entertainment device and operation device in such an entertainment system are usually connected by a serial interface. When a clock (pulse) is sent from the entertainment device, key switch information, etc. that corresponds to operations by the user with respect to said operation device operations is sent to the entertainment device synchronized to the clock (pulse).

Recently, operation devices have been equipped with built-in vibration generation means, i.e. tactile feedback, to provide vibration to the user upon request from outside (for example, from the entertainment device), so as to give the user various types of tactile feedback in response to user operations, for example, during the course of playing a game.

The spread of networks (such as the Internet, for example) has made it simple for users to extract, via their computers, information distributed from a server, and to conveniently send text to recipients using e-mail. Of course, a user can not only receive information but also provide information to a server, for example in the form of submitting an article.

Such widespread use of networks makes it simple and speedy to obtain information, allowing users to obtain, as text data or image data, various information from countries all over the world while remaining at home or at the office.

Obtaining information via a network is done by connecting the user-side computer to the network. If the information is text data only, a short-duration connection suffices, but if the information is image data or audio data, a long-duration connection is necessary in order to take in such information. Because of this, there is the problem that the user is tied down to his computer for a long time, and the communication expenses grow large as well.

Examples have been proposed in which the connection between the user-side computer and the network is made of short duration, and in the short-duration connection information is received from the server and information from the user is transmitted (for example, see unexamined patent H11-46193 [1999] and unexamined patent H9-269923 [1997]).

Also, examples have been proposed in which if information obtained from a server via the network is to be reported to the user, and is conveyed via characters displayed on a monitor (for example, see unexamined patent H11-242546 [1999]).

Heretofore, if the connection with the server was to be reported to the user, all that was done was, for example, to display a message such as "Connected" on the monitor, which is uninteresting.

In addition, information conveyed via cartoon-like characters is exclusively the content of an e-mail transmitted to the user and is not information for the submission of user-contributed articles sent to the server. There is the problem that in order to see this contributed information, it is necessary to continue to maintain the connection to the server, which requires communication expenses as stated above. Moreover, the contributed content is displayed in a state when it has been almost entirely input, which is uninteresting.

In other words, heretofore it has been a concept of transferring to the user side and viewing information from the server in an exchange of information between individuals, such as e-mail, but if one is to see the contributed information of users, one usually has to go to the server to see it.

SUMMARY OF THE INVENTION

The purpose of this invention, which was devised in consideration of such problems, is to provide a communication system, a computer program execution device, a recording medium, and a computer program that make it possible to confirm contributed information from users collected in a server in a state where the connection with the server is interrupted and via a program in which various characters appear, thereby making it possible to build a new program distribution mode using a network.

Another purpose of this invention is to provide a method for supplying program information and a program information editing method that make it possible to build a new program distribution mode using a network.

The present invention comprises a server that is connected to a network, and a computer program execution device that can be accessed to said server via said network and to which at least a display device is connected. Said computer program execution device has a program processing means that accesses said server and performs at least a first access processing that receives information for constituting a series of programs, and a second access processing for sending user contributed information.

In addition, the present invention further comprises, a computer program execution device that can be accessed to a server via network and to which at least a display device is connected, a program processing means that accesses said server and performs at least a first access processing that receives information for constituting a series of programs and a second access processing for sending user contributed information.

Furthermore, the present invention being a recording medium on which are recorded a computer program and data to be used in an entertainment device that can be accessed to a server via network, said program has a program processing step that accesses said server and performs at least a first access processing that receives information for constituting a series of programs and a second access processing for sending user contributed information.

In addition, the present invention further comprises a computer-readable and -executable computer program used in a computer program execution device that can be accessed to a server via network, which has a program processing step that accesses said server and performs at least a first access processing that receives information for constituting a series of programs and a second access processing for sending user contributed information.

Said program processing means (step) may be made so that the connection with the server is interrupted at the stage in which said first access processing has ended and at the stage in which said second access processing has ended.

In this way, first, via the first access processing, the computer program execution device that is set up at each user receives from the server at least information for constituting a series of programs. At each user, at the stage in which said first access processing has ended, the connection with the server is interrupted, and based on the information that has been received, a series of programs is constituted and is displayed on the display device.

Each user can know the contributed content of each user via the lines of dialog and placards of various characters that appear in a series of programs displayed on a display device.

If a user has information he wishes to contribute, he can transfer his contributed information to the server via the second access processing while the series of programs is continuing or after it ends. Of course, the connection with the server is interrupted at the stage in which the second access processing has ended.

Thus, in accordance with the teachings of the present invention, it is possible to confirm (to gen up) contributed information from users collected in a server in a state where the connection with the server is interrupted and via a program in which various characters appear, thereby making it possible to build a new program distribution mode using a network.

Said series of programs may be characterized (constituted) by multiple sequences having two or more different time widths, in which case the series of programs will exhibit variety, which will prevent the user from becoming bored. And if the various sequences are prepared so as to have continuity with each other, the series of programs can be realized as a fixed program.

The information that constitutes said series of programs may be, for example, instruction information that indicates the movement data of the characters that appear in the multiple sequences that constitute said series of programs, the order of said multiple sequences, and contributed information from each user. The transfer speed of this various information can be improved because it can be constituted as text data. And if only the parts that change are transferred, the transfer speed can be further increased, and the time needed for the first access processing can be shortened.

Said program processing means (step) may have a program production means (step) that produces said series of programs based on information from said server by said first access processing, and a program display means (step) that displays on a display device the program produced by said program production means (step). If so, said program display means (step) may display an opening scene during said first access processing and display said series of programs at least at the stage in which said first access processing has ended.

In this way, the user can naturally have empathy for the program without being aware of the first access processing by the computer program execution device, and thus the irritation of waiting for loading can be eliminated. In addition, contributed information that is input at an appropriate time during a program or after a program has ended is transferred to the server via the second access processing.

Thus, in the present invention, in a program composition in which access to the server is a mandatory element, the user is allowed to enjoy the program without being made aware of this access, and in this way he can be made to contribute to the promotion of the development of new program compositions.

The communication system of the present invention is further characterized in that it transmits a program information file from the server to the user-side computer program execution system, and it outputs to the monitor of said computer program execution system a program constituted by the information registered in said program information file and the information held in said computer program execution system.

Thus information that is mainly text data is transmitted from the server to each user's computer program execution system, and a program can be constituted by combining, for example, image data with said information in each user's computer program execution system. Because of this, the transfer speed from the server to each user's computer program execution system can be increased, thereby eliminating the user's long wait for information sent from the server. As a result, the effect can be obtained that the popularization of program distribution over the network is encouraged.

The information registered in said program information file may be at least information concerning multiple sequences constituting programs and contributed text to be announced in each sequence, while the information held in said computer program execution system may be at least motion data including the conversation output of characters that appear in said multiple sequences. In this way, the content of a program information file to be transmitted from the server to each user's computer program execution system can be made into something that is mostly text data, thus making it possible to achieve an improved transfer speed of the data from the server to each user's computer program execution system.

In addition, in supplying programs consisting of information registered in program information files transmitted from a server to each user's computer program execution system and information held in said computer program execution system, the present invention is characterized in that it has processing that produces object data of multiple characters to be displayed on the monitor of each user's computer program execution system, processing that produces movement data for each sequence of said multiple characters that appear in the multiple sequences that constitute said program, and processing that records on a recording medium distributed to each user the object data of the produced said multiple characters and movement data for each sequence.

In this way, first, the object data of multiple characters is produced, and movement data for each sequence of multiple characters that appear in multiple sequences is produced. The object data and movement data for each sequence is recorded on a recording medium that is distributed to each user.

Said recording medium is distributed to each user and is installed on each user's computer program execution system. That is, at this stage, the information recorded on the recording medium is held in the computer program execution system.

In other words, large-data-quantity character object data and movement data are held in each user's computer program execution system, and in this way it becomes possible to transmit from the server to each user's computer program execution system information that is mainly text data. Because of this, the transfer speed from the server to each user's computer program execution system can be increased, thereby eliminating the user's long wait for information sent from the server. As a result, the effect can be obtained that the popularization of program distribution over the network is encouraged. Also, a program is created by combining information transmitted from the server to each user's computer program execution system and information that is held in the computer program execution system.

Furthermore, the present invention may further have processing that produces multiple background images to be displayed in the multiple sequences that constitute said program, and processing that records on said recording medium background images selected from the produced multiple background images.

In this way, in a specified program, the background image can be changed on various commemorative days, etc. if background images to which a change is to be made on various commemorative days, etc. are stored on the server and the background image that corresponds to the time is transmitted from the server to each user's computer program execution system. Because of this, the user can enjoy a program while being aware of a seasonal feeling or the existence of a commemorative day. Because background images for each season do not change frequently, they may be held in each user's computer program execution system.

And because background images unrelated to seasons or commemorative days can be recorded on said recording medium, there is no need to transmit all the background images, and as a result it is possible to suppress the prolongation of transfer time caused by the transmission of background images.

In transmitting program information files from a server to each user's computer program execution system and editing a program consisting of information registered in said program information files and information held in said computer program execution system, the present invention further comprises processing that determines the combination of multiple sequences that constitute said program and registers information on the sequences relating to this combination in a program information file, processing that selects contributed texts sent from each user and extracts the contributed text to be announced in each sequence, and processing that registers the extracted contributed texts in the information of the sequence that corresponds to said contributed texts among the information of the multiple sequences registered in said program information files.

In this way, the multiple sequences that constitute the program are determined on the server side, and information concerning these sequences is registered in the program information file. Also, the contributed texts to be announced are extracted from the contributed texts sent from the users, and these texts to be announced are registered in the corresponding sequence information.

The program information file in which the various information is registered as described above is transmitted from the server to each user's computer program execution system. On the side of each user, the program is composed and displayed on the monitor based on information concerning sequences registered in the received program information file, and in each sequence the corresponding contributed text is announced (displayed).

Thus, the present invention makes it possible to build a new mode of program distribution using a network.

Furthermore, when registering said extracted contributed texts in the information of the sequence that corresponds to said contributed texts among the information of the multiple sequences registered in said program information file, the feeling that can be judged from said contributed text may be made into flag information and registered together with said contributed text.

Thus, when announcing a contributed text at each user, it is possible to announce it together with the feeling based on said flag information. Because of this, rather than simply presenting a contributed text, if the contributed text is for example of a happy content, it is possible for example to make a sequence content in which the characters that appear in the sequence present contributed texts enjoyably, and thus one can put together a program that one does not grow tired of. There is the further advantage of being able to make the user more aware of the contributions, thus encouraging the submission of contributions.

BRIEF DESCRIPTION OF THE DRAWINGS

FIG. 28 is an explanatory diagram showing the itemization of the present points table.

DETAILED DESCRIPTION OF THE PREFERRED EMBODIMENTS

Figure 1:
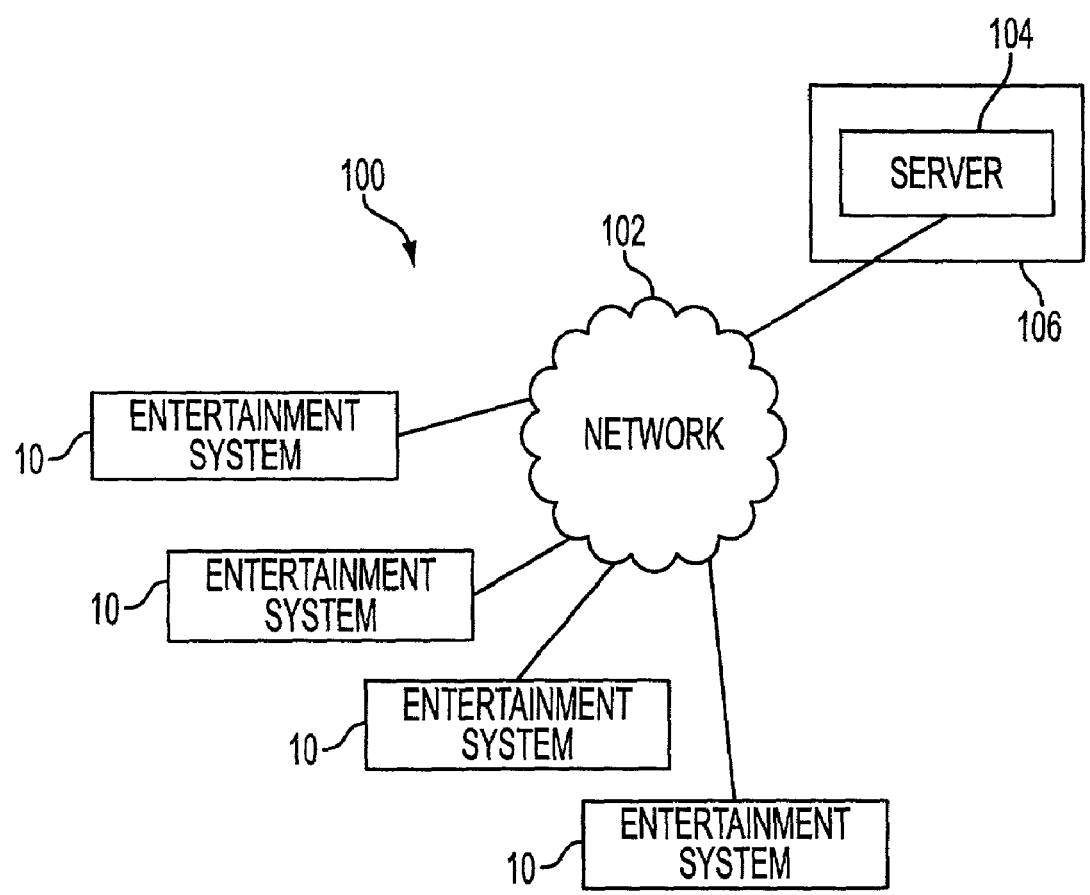
FIG. 1 is a composition diagram showing a communication system relating to the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

As shown in FIG. 1, communication system 100 of the present invention has server 104 connected to network 102, and multiple entertainment systems 10 that can be accessed via said server 104 and network 102.

In the following description, the station at which server 104 is installed is called site 106. In the present embodiment, said network 102 is the Internet, and said server 104 is a prescribed website (a web server having a home page). The arrangement is such that a user connected to this Internet 102 can view Internet 102 information in hypertext format via the www (World Wide Web).

Figure 2:
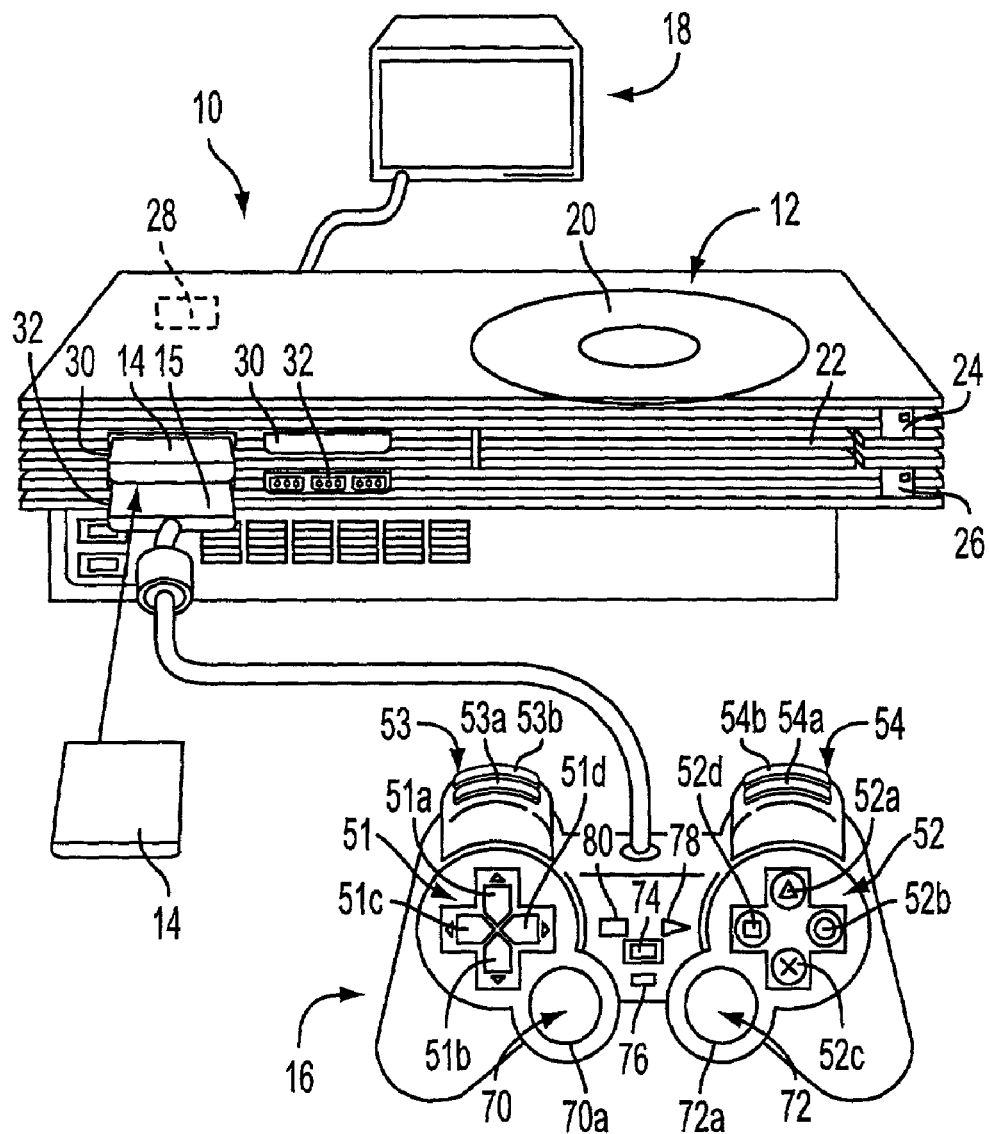
FIG. 2 is a composition diagram showing an entertainment system relating to the present invention.

As shown in FIG. 2, entertainment system 10 consists basically of entertainment device 12, which executes various computer programs, memory card 14, which can freely be attached to and detached from said entertainment device 12, operation device (controller) 16, which can be freely attached to and detached from entertainment device 12 and monitor (display device: display) 18, which is a television receiver or other display device to which are supplied video and audio signals from entertainment device 12.

Entertainment device 12 is for reading computer programs recorded on a high-capacity recording medium, such as a CD-ROM or DVD-ROM or other optical disk 20, and executing games, etc. according to instructions from the user (for example, game players). Execution of a game means mainly receiving input from controller 16 via connector 15 and controlling the progress of the game while controlling the display and sound on monitor 18.

As shown in FIG. 2, entertainment device 12 of the present invention has the shape of flat rectangular parallelepipeds piled atop one another. Arranged on the front panel of entertainment device 12 are disk tray (disk mounting unit) 22, into which a recording medium (optical disk) 20 having a computer program and related data is mounted and which moves frontward and rearward, reset switch 24 for arbitrarily resetting, etc. a computer program, etc. currently in the midst of execution, open button 26 for pulling out disk tray 22, two insertion openings 30 for memory cards 14 and two controller terminals 32, etc. into which connector 15 of controller 16 is inserted. Arranged on the rear surface of entertainment device 12 are power switch 28 and an AV (audio-visual) multi-output terminal (not shown), etc., which is an output terminal for video and audio and is attached to monitor 18 via an AV cable.

Entertainment device 12 contains control functions to read and execute computer programs from optical disk 20 or other recording medium on which are recorded said computer programs and data for a computer game (video game), and to display characters and scenes on monitor 18. Device 12 also has built in various control functions such as playback of images by DVD (digital versatile disk), which is another optical disk 20, and playback of music by CDDA (compact disk digital audio). Entertainment device 12 also has the function of executing computer programs obtained by communication via a communication network, etc. Displayed on monitor 18 as a display device during execution of a computer program for a video game are three-dimensional computer graphics video generated by entertainment device 12.

In the device 12 of the invention, signals from controller 16 are also processed by one of said control functions of entertainment device 12, and its content is reflected in, for example, the movement of characters or the switching of scenes on the screen of monitor 18.

On controller 16, first and second operation units 51 and 52 are provided left and right in the middle of the upper surface, third and fourth operation units 53 and 54 are provided on its side surface, and provided left and right on the near side of its upper surface are left-side rotation operation stick 70 and right-side rotation operation stick 72 (which are both joysticks) for performing analog operations.

First operation unit 51 is a pressing operation unit for, for example, imparting movements to characters, etc. displayed on the screen of monitor 18, and its functions are set by a computer program, etc. recorded on optical disk 20. First operation unit 51 consists of four operation keys (direction keys) 51a, 51b, 51c, 51d that have the functions of moving a character, etc. up, down, left, right, etc. Direction key 51a is also called the upward key, direction key 51b is also called the downward key, direction key 51c is also called the leftward key, and direction key 51d is also called the rightward key.

Second operation unit 52 has four cylindrical operation buttons 52a, 52b, 52c, 52d for pressing operation with identification marks "Δ", "○", "x", "□" are attached to the tops of operation buttons 52a-52d, respectively.

Operation buttons 52a-52d are also called, respectively, Δ (triangle) button 52a, ○ (circle) button 52b, x (cross) button 52c, and □ (square) button 52d.

The functions of operation buttons 52a-52d of this second operation unit 52 are set by computer programs, etc. recorded on optical disk 20. For example, functions such as moving the left arm, right arm, left leg, and right leg of a character, etc. and assigned to operation buttons 52a-52d.

Third and fourth operation units 53 and 54, which have the same structure, each have operation buttons for pressing operation aligned two each on top and bottom, i.e., operation button (L1 button) 53*a* and operation button (L2 button) 53*b*, as well as operation button (R1 button) 54*a* and operation button (R2 button) 54*b*. The functions of these third and fourth operation units 53 and 54 are likewise set by computer programs recorded on optical disk 20, such as the function of causing a character to perform special movements.

Left-side rotation operation stick 70 and right-side rotation operation stick 72 each have a signal input element such as a variable resistor that can rotate 360° about the operation axis, and an analog value is output in correspondence with the tilt. Left- and right-side rotation operation sticks 70 and 72 return to their central position by elastic members (not shown). By pressing left- and right-side rotation operation sticks 70 and 72 downward, a signal separate from the analog value associated with the tilt of left- and right-side rotation operation sticks 70 and 72 is output. In other words, left- and right-side rotation operation sticks 70 and 72 have the functions of operations buttons (L3 button) 70*a* and (R3 button) 72*a* as fifth and sixth operation units for pressing operation.

By rotating and tilting left- and right-side rotation operation sticks 70 and 72, one can input command signals that make it possible to perform analog movements such as causing characters, etc. to rotate as they move, or vary their speed as they move, or change their shapes.

In FIG. 2, left- and right-side rotation operation sticks 70 and 72 can be used by switching (alternatively) between aforesaid first and second operation units 51 and 52. This switching is done by analog mode switch 74. When left- and right-side rotation operation sticks 70 and 72 are selected by analog mode switch 74, display unit 76 flashes to display the selection state of left- and right-side rotation operation sticks 70 and 72.

Besides the foregoing, controller 16 also has start button (start switch) 78, which indicates the start of a game, etc., and selector button (selector switch) 80, which selects the game's degree of difficulty, etc.

Figure 3:
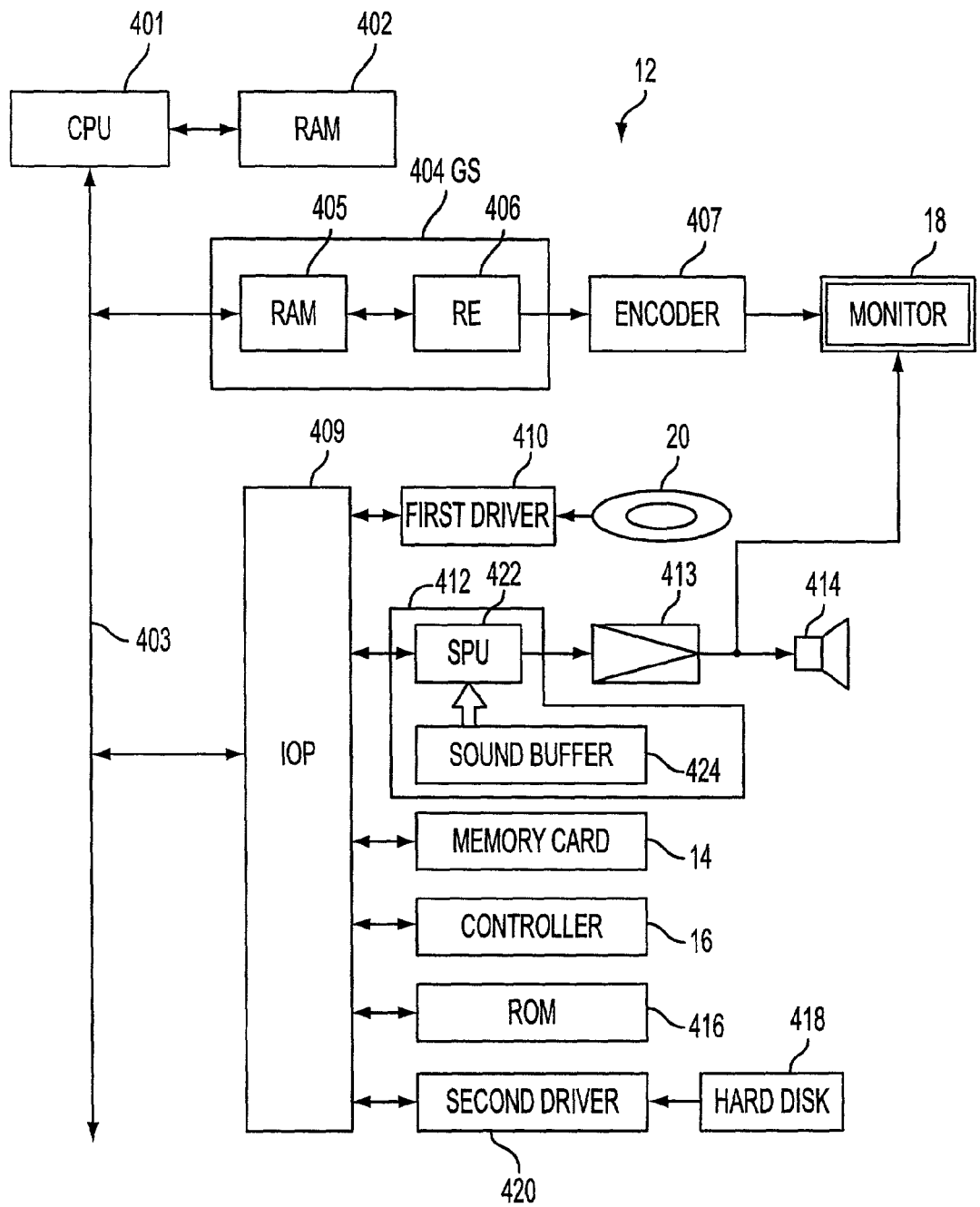
FIG. 3 is a block diagram showing the circuit composition of an entertainment system of the present invention.

Next, referring to FIG. 3, the internal composition and general operation of entertainment device 12 shown in FIG. 2 will now be described.

Entertainment device 12 has CPU 401, which controls said entertainment device 12, and connected to this CPU 401 are RAM 402 as a semiconductor memory and bus 403.

Connected to said bus 403 are graphic synthesizer (GS) 404 and input-output processor (IOP) 409. Included in GS 404 are RAM (image memory) 405, which includes a frame buffer, Z buffer, and texture memory, etc., and rendering engine 406, which has rendering functions that include the function of drawing to the frame buffer in this image memory 405. Monitor 18 as external equipment is connected to this GS 404 via encoder 407 for, for example, converting digital RGB signals, etc. to the NTSC-standard television system.

Connected to IOP 409 are driver 410 for playing and decoding data recorded on optical disk 20, sound generation system 412, memory card 14 as external memory that consists of flash memory, controller 16, ROM 416, on which is recorded the operating system, etc., and second driver 420 for accessing data with respect to hard disk 418. Sound generation system 412 is connected via amplifier 413 to speaker 414 and monitor 18 as external equipment, and supplies audio signals thereto.

Sound generation system 412 has sound processing device (sound processing unit: SPU) 420, which generates music and sound effects, etc. based on instructions from CPU 401, and sound buffer 424, which stores the music and sound effects, etc. generated by this SPU 422. The signals of the music and sound effects, etc. generated by SPU 422 are supplied to the audio terminals of speaker 414 and monitor 18, and in this way music and sound effects, etc. are output (emitted) from said speaker 414 and monitor 18.

In the present invention, SPU 422 has an ADPCM (Adaptive Differential Pulse Code Modulation) decoding function, which generates audio data in which, for example, 16-bit audio data is adaptively encoded as 4-bit difference signals, a playback function that plays back the waveform data stored in sound buffer 424 and a modulation function, which modulates and plays back the waveform data stored in sound buffer 424.

By having such functions, sound generation system 412 can be used as a so-called sampling sound source, which generates music and sound effects, etc. based on waveform data recorded in sound buffer 424 under instructions from CPU 401.

Memory card 14 is a card-type external memory device that consists of, for example, a CPU or gate array and flash memory. Through its insertion opening 30, memory card 14 can be freely attached to and detached from entertainment device 12, and stored on this memory card 14 are the intermediate state of games, and programs, etc. for DVD playback.

Controller 16 is for giving entertainment device 12 commands (two-value commands or multi-value commands) by pressing multiple buttons provided thereon. Also, first driver 410 has a decoder for decoding images encoded based on the MPEG (Moving Picture Experts Group) standards.

Next, we describe how images are displayed on monitor 18 by operation of controller 16. As a premise, it is assumed that object data consisting of polygon vertex data, texture data, etc. recorded on optical disk 20 is read via first driver 410 and is held in RAM 402 of CPU 401.

When instructions from the user are input to entertainment device 12 via controller 16, based on these instructions CPU 401 computes the position of objects in three dimensions (3D) and their orientation with respect to the viewpoint. Thus the polygon vertex data of an object defined by the X, Y, Z values of three orthogonal axes is changed. The post-change polygon vertex data is transformed by perspective transformation processing into two-dimensional coordinate data.

The region prescribed by the two-dimensional coordinates is a so-called polygon. The post-transformation two-dimensional coordinate data, Z data, and texture data are supplied to GS 404. GS 404 performs drawing processing by performing rendering based on the post-transformation two-dimensional coordinate data and Z data, and sequentially drawing the texture data to image memory 405 (in this case, to the frame buffer). After the image of one frame completed by this drawing processing is encoded by encoder 407, the drawn texture data is supplied to monitor 18 and is displayed as an image on its screen.

Figure 4:
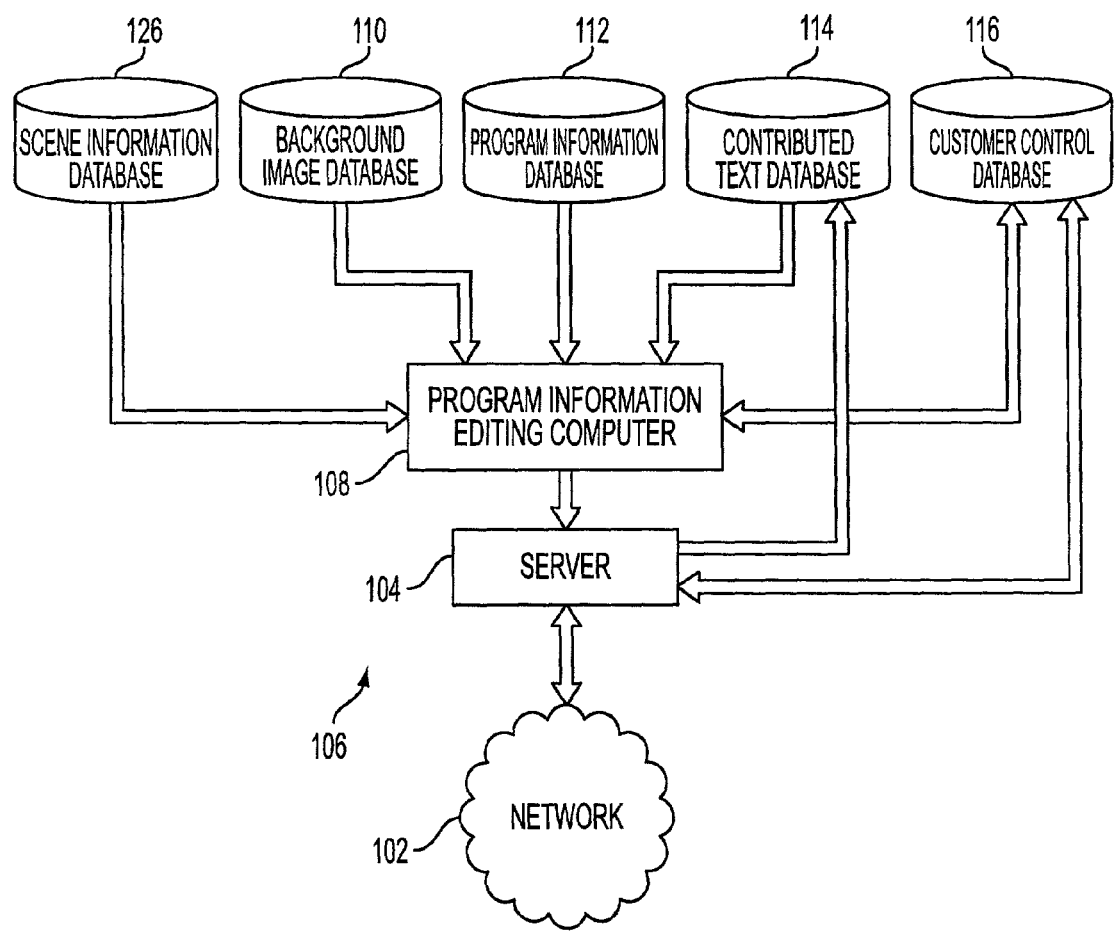
FIG. 4 shows the connection relationships of a server installed at the site, a computer for program information editing, and various databases.

Meanwhile, as shown in FIG. 4, installed at site 106 are server 104 and program information editing computer 108, and also provided, connected to server 104 and program information computer 108, are multiple databases (for example, background image database 110, program information database 112, contributed text database 114, customer control database 116, and scene information database 126).

Next, we describe, with reference to FIGS. 5-39, the characteristic function of the communication system 100 of the present invention.

This function is to transmit a program information file from server 104 to each user's entertainment system 10 and output to monitor 18 of entertainment system 10 a program composed by information registered in said program information file and information held in each entertainment system 10.

In realizing this function, the communication system accesses server 104 and performs first access processing in which it receives information (program information files) for constituting at least a series of programs, and second access processing for sending users' contributed information.

Figure 5:
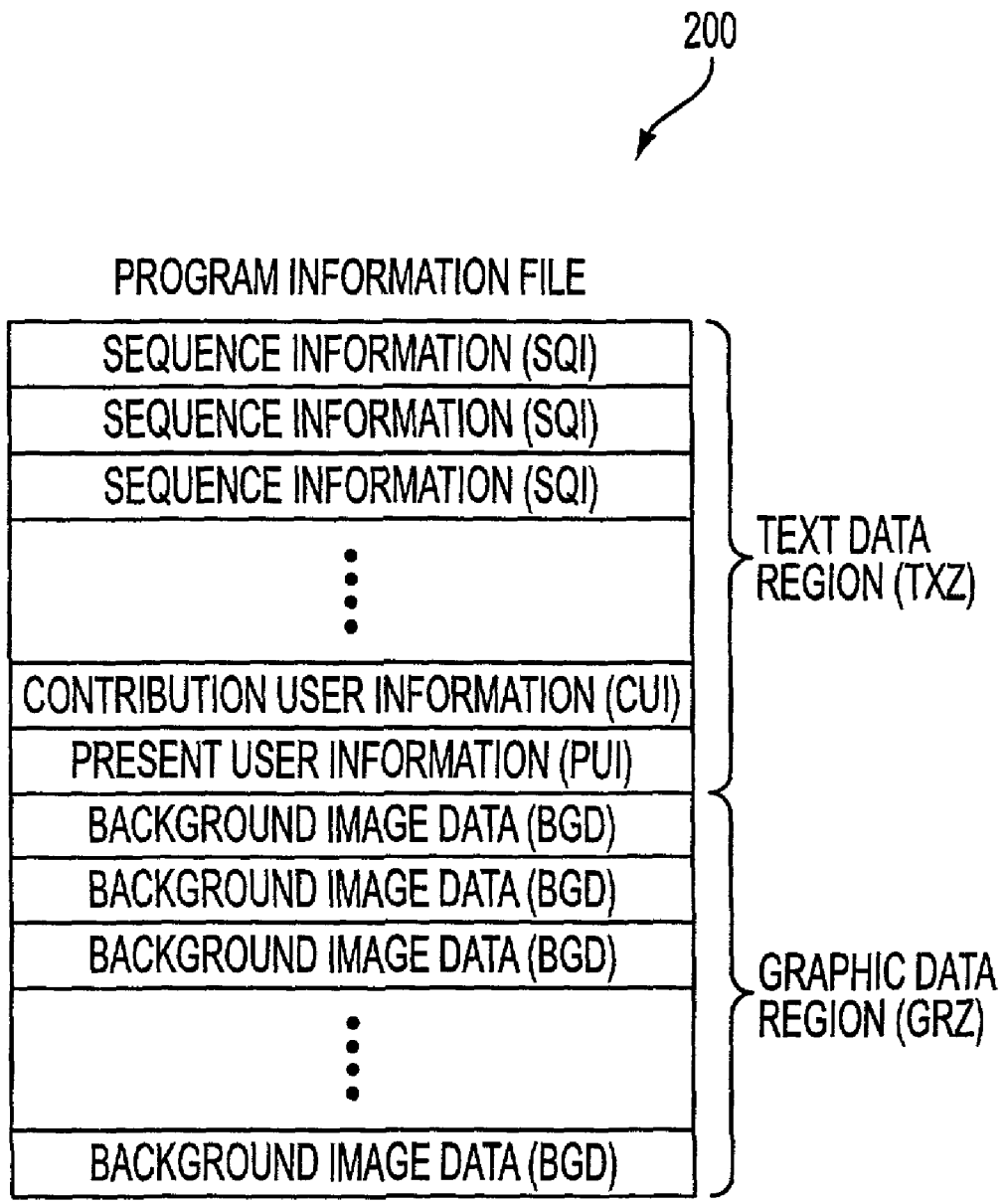
FIG. 5 is an explanatory diagram showing the itemization of a program information file.

As shown in FIG. 5, program information file 200 has text region TXZ and graphic data region GRZ. Registered in text region TXZ are multiple sequence information SQI that constitute said program, contribution user information CUI concerning contributions, and present user information PUI concerning presents. Registered in graphic data region GRZ are one or more items of background image data BGD.

Figure 6:
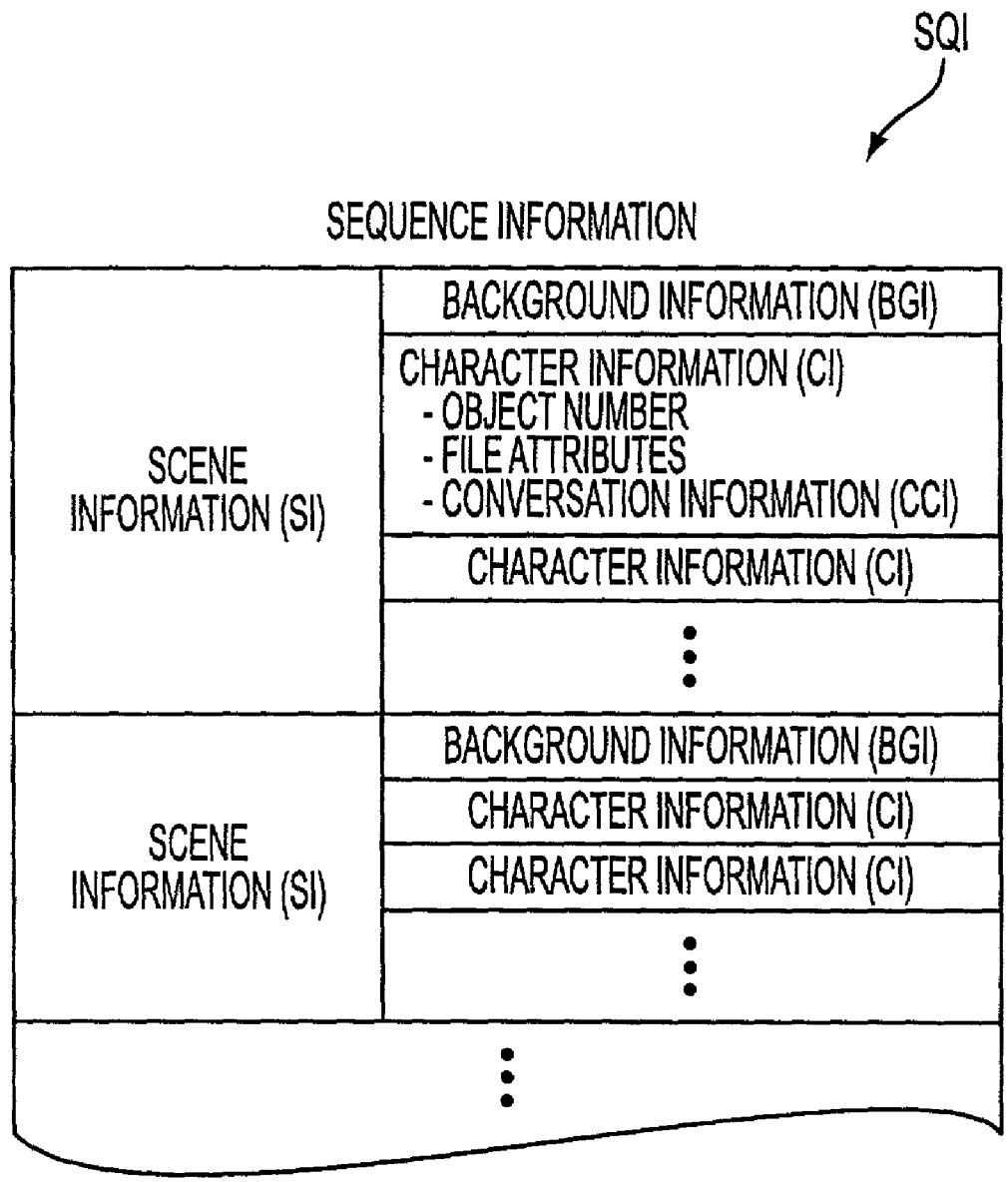
FIG. 6 is an explanatory diagram showing the itemization of sequence information.

Registered in sequence information SQI are one or more items of scene information SI that constitute said sequence, in the order in which they are to be broadcast. As shown in FIG. 6, one item of scene information SI consists of information on the background image data BGD to be used in the scene (background information BGI), and one or more items of character information to appear in said scene (character information CI). The details of these items of information are described in detail later.

Figure 7:
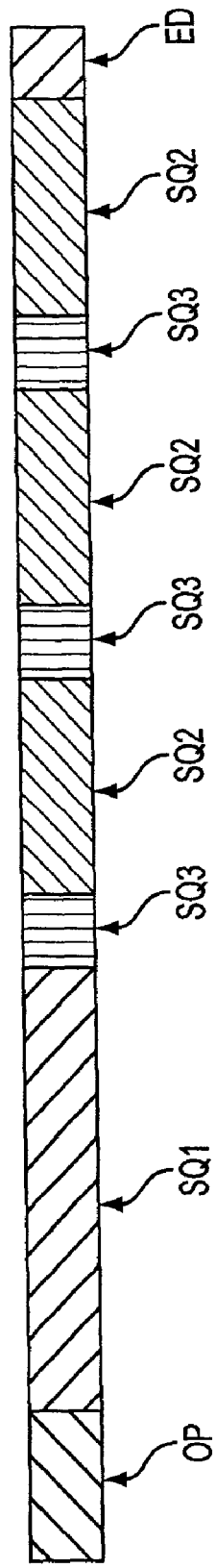
FIG. 7 is an explanatory diagram showing the composition of a program.

Here we describe the composition of a program and the supply of program information. First, we describe the composition of a program concerning a program of one day of the week (for example, Monday), in the example of a case in which its overall length is, for example, 15 minutes. As shown in FIG. 7, the program consists of the combination of opening OP, first sequence SQ1, whose broadcast time is the longest, second sequence SQ2, whose broadcast time is shorter than that of first sequence SQ1, third sequence SQ3, whose broadcast time is the shortest, and ending ED. Each sequence SQ1, SQ2, and SQ3 consists of one or more scenes each.

In the example of the program in FIG. 7, it is arranged in the order opening OP, first sequence SQ1, first third sequence SQ3, first second sequence SQ2, second third sequence SQ3, second second sequence SQ2, third third sequence SQ3, third second sequence SQ2, and ending ED. Various such compositions are conceivable, and the broadcast times are arbitrary too.

Figure 8:
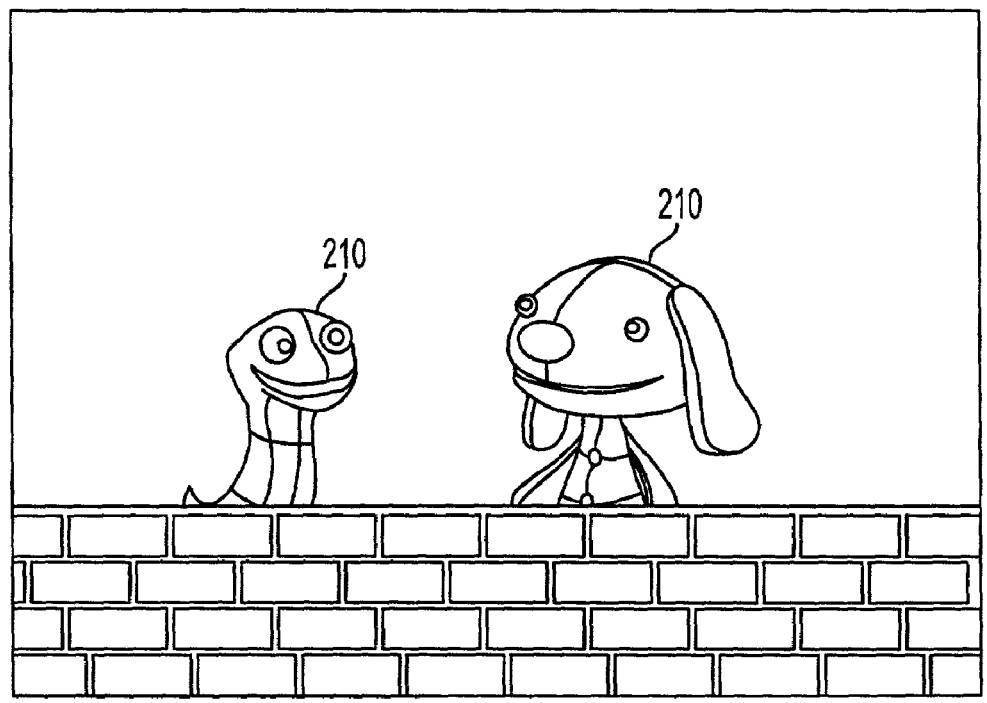
FIG. 8 is an explanatory diagram showing one shot of a scene comprising the first sequence.
Figure 9:
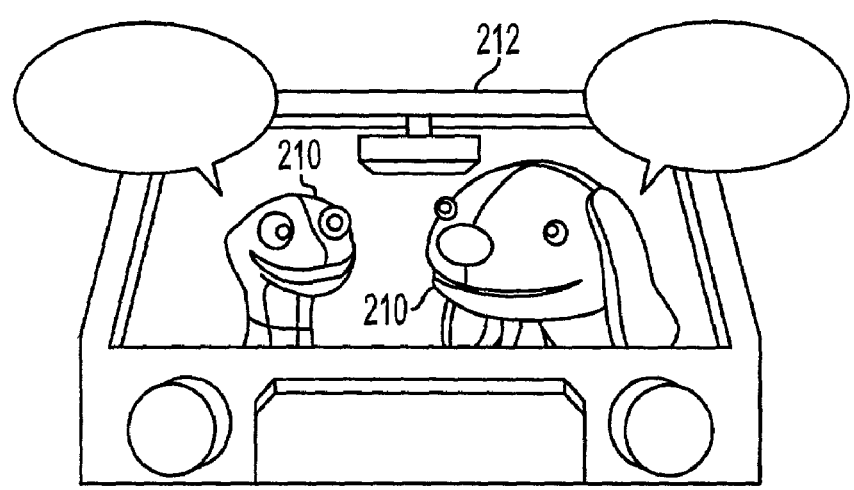
FIG. 9 is an explanatory diagram showing another shot of a scene comprising the first sequence.
Figure 10:
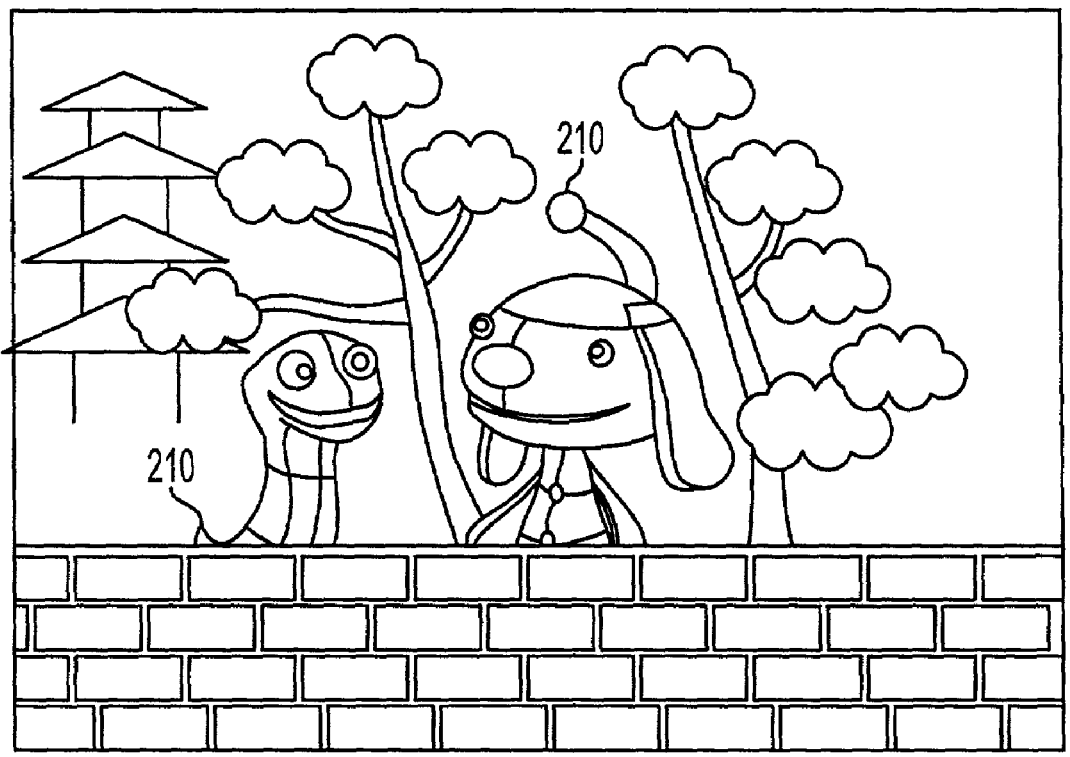
FIG. 10 is an explanatory diagram showing still another shot of a scene comprising the first sequence.
Figure 11:
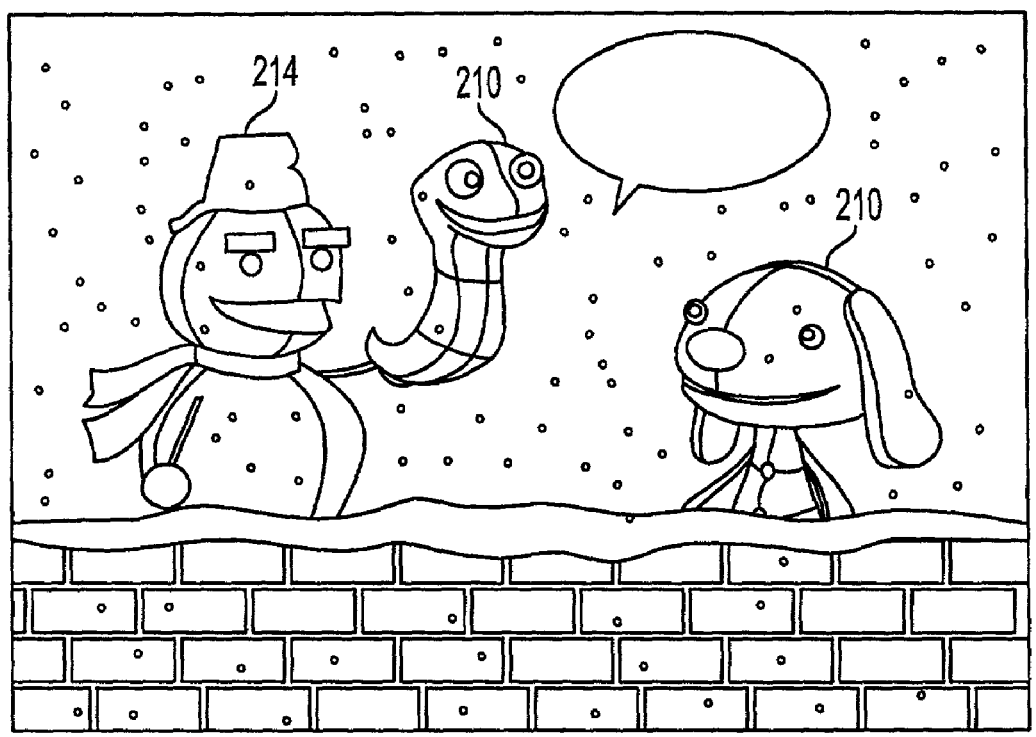
FIG. 11 is an explanatory diagram showing still another shot of a scene comprising the first sequence.

Taking a look at the itemization of sequences SQ1, SQ2, and SQ3, first sequence SQ1, which is a sequence whose broadcast time is, for example, about 5 minutes, is for example a drama played by characters as shown in FIGS. 8-11. During this drama, every day the background changes, and the clothing of the characters changes as well. FIG. 8 shows a shot in which characters 210 appear, and FIG. 9 shows a shot in which characters 210 ride in cardboard car 212 and talk while taking a drive. FIG. 10 shows a shot in which one of the characters 210 appears like a prince and is playing a historical drama, and FIG. 11 shows a shot in which characters 210 travel along a winter street together with snowman 214. In the movement of "talking," what is being said is displayed in dialog balloons, and if necessary the audio is output. This is the same in second and third sequences SQ2 and SQ3 as well.

Figure 12:
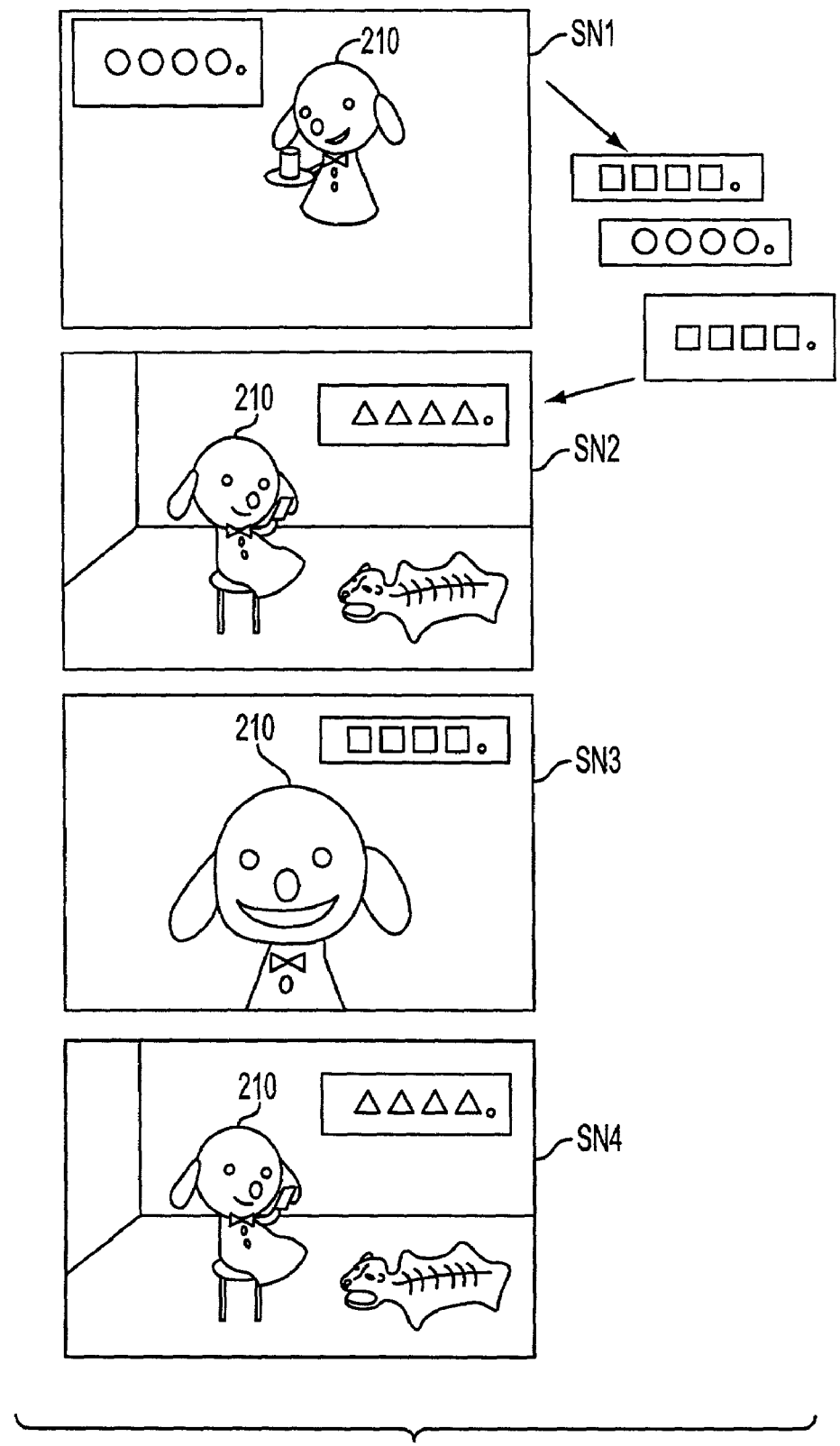
FIG. 12 is an explanatory diagram showing four representative scenes among the scenes that comprise the second sequence.

Second sequence SQ2, which is a sequence whose broadcast time is, for example, about 2 minutes, is a sequence that presents a relatively long contributed text. As shown in FIG. 12 as an example, this second sequence SQ2 is one in which, for example, one character 210 presents contributed text from the user. This FIG. 12 shows one sequence in which, in first scene SN1, character 210 speaks the first fixed text, such as "Today too this many postcards arrived." In second scene SN2, character 210 says the first half of the contributed text. In third scene SN3, character 210 says a comment (inserted text) in reply to the contributed content and in fourth scene SN4, character 210 says the last half of the contributed text.

This second sequence SQ2 is only an example, and there could be various combinations depending on the length and content of the contributed text. For example, while making the transition from first scene SN1 to second scene SN2, three scenes could be newly added, with inserted text "○○○○", fixed text "○○○○", and inserted text "○○○○".

Third sequence SQ3, although not shown, is one in which a one-phrase contributed text is presented in the form of, for example, a bulletin board.

Figure 13:
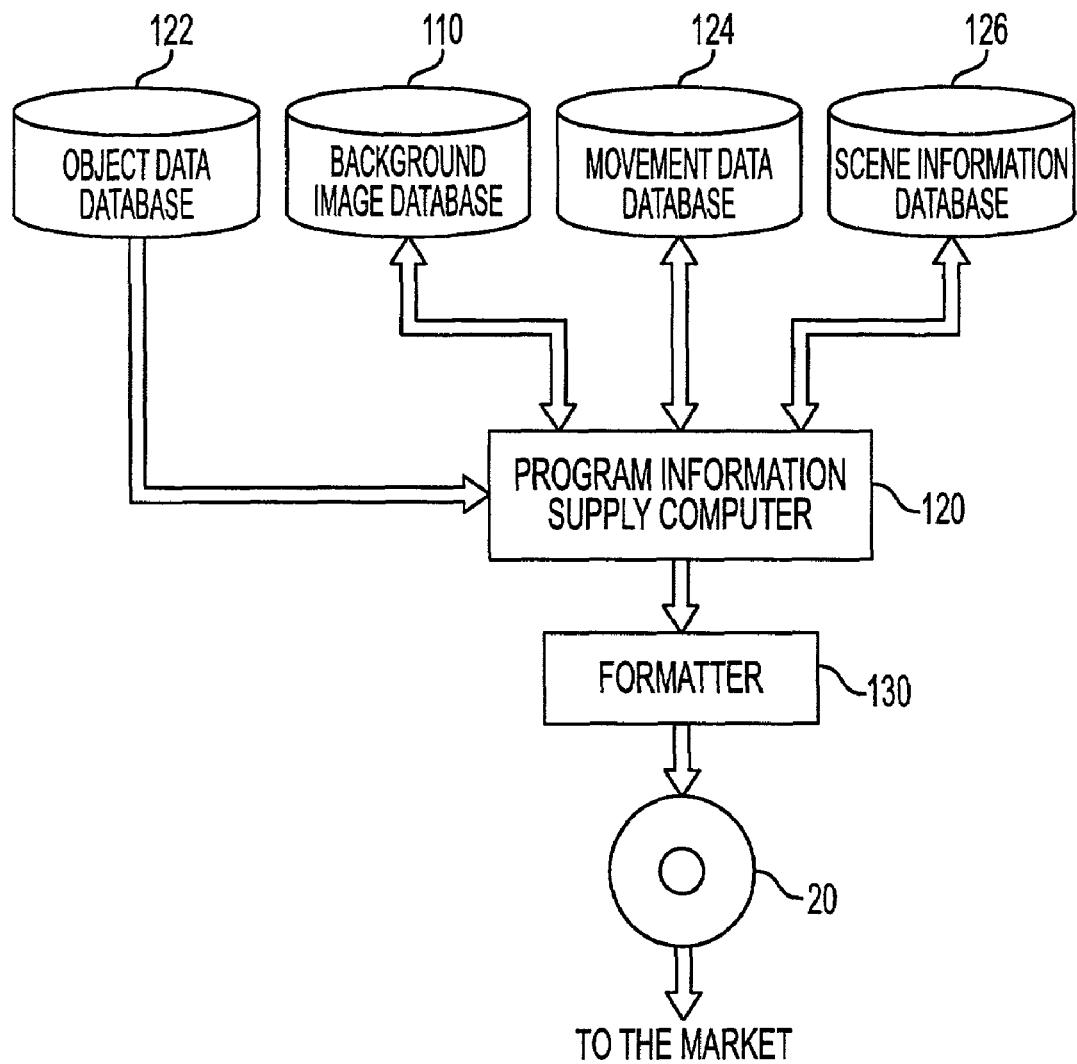
FIG. 13 is a composition diagram showing the system when it supplies a program.

Next, we describe, with reference to FIGS. 13-20, the supply of the aforementioned program information. As shown in FIG. 13, the supply of program information is done using program information supply computer 120. Connected to this program information supply computer 120 are object data database 122, movement data database 124, background image database 110, and scene information database 126.

Figure 14:
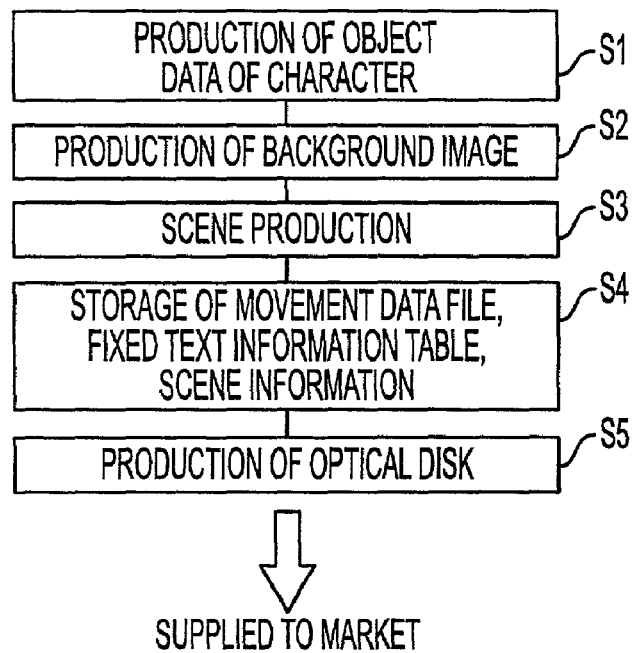
FIG. 14 is a process block diagram showing program information supply processing.

As shown in FIG. 14, in the supply of program information, first, in step S1, the object data of the characters 210 that appear in each sequence is produced, and this is stored in order in object data database 122. Then, in step S2, background image data BGD to be displayed in each sequence is produced. In this case, the processing of step S2 includes production of background image data BGD by taking and editing a photograph or three-dimensional computer graphics (CG). Produced in step S2 are background image data BGD for each season, background image data BGD corresponding to various commemorative days, background image data BGD resembling a major city, etc. The produced background image data BGD is successively stored in background image database 110.

Then, in step S3, the multiple scenes that constitute each sequence are produced. Specifically, one determines for each scene the movements and conversation texts of characters 210. In determining the conversation text, one decides the content of the fixed text and the place (shot) where the fixed text is to be inserted, as well as the places (shots) where the contributed text and inserted text are to be inserted. At this stage, the movement data of characters 210 and the information concerning the fixed texts is completed. The content of the contributed texts and inserted texts is determined by program information editing, which will be described later.

Then, in step S4, the multiple items of movement data completed by production of each scene are organized in the form of a movement data file 220 corresponding to each scene (see FIG. 16), and these movement data files 220 are sequentially stored in movement data database 124. Fixed texts consisting of data concerning completed fixed texts, that is, text data, is organized in the form of fixed text information table 222 (see FIG. 15) and is stored in movement data database 124.

Figure 15:
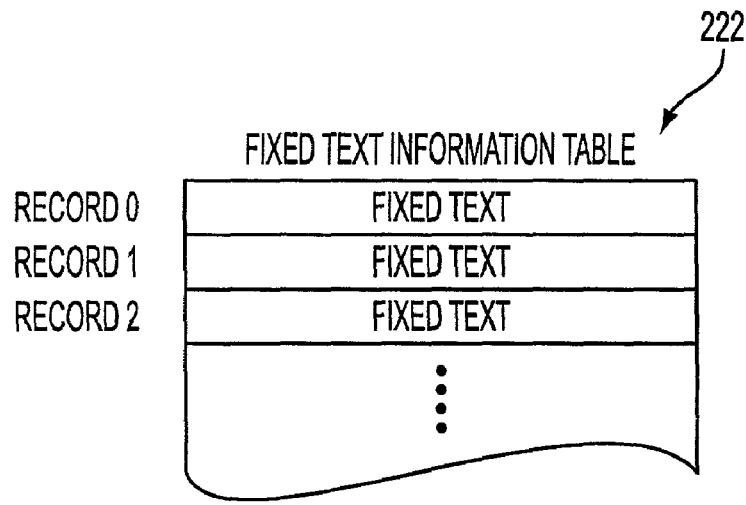
FIG. 15 is an explanatory diagram showing the itemization of the fixed text information table.

Fixed text information table 222 consists of the arrangement of multiple records as shown in FIG. 15, and a different fixed text is registered for each record.

Figure 16:
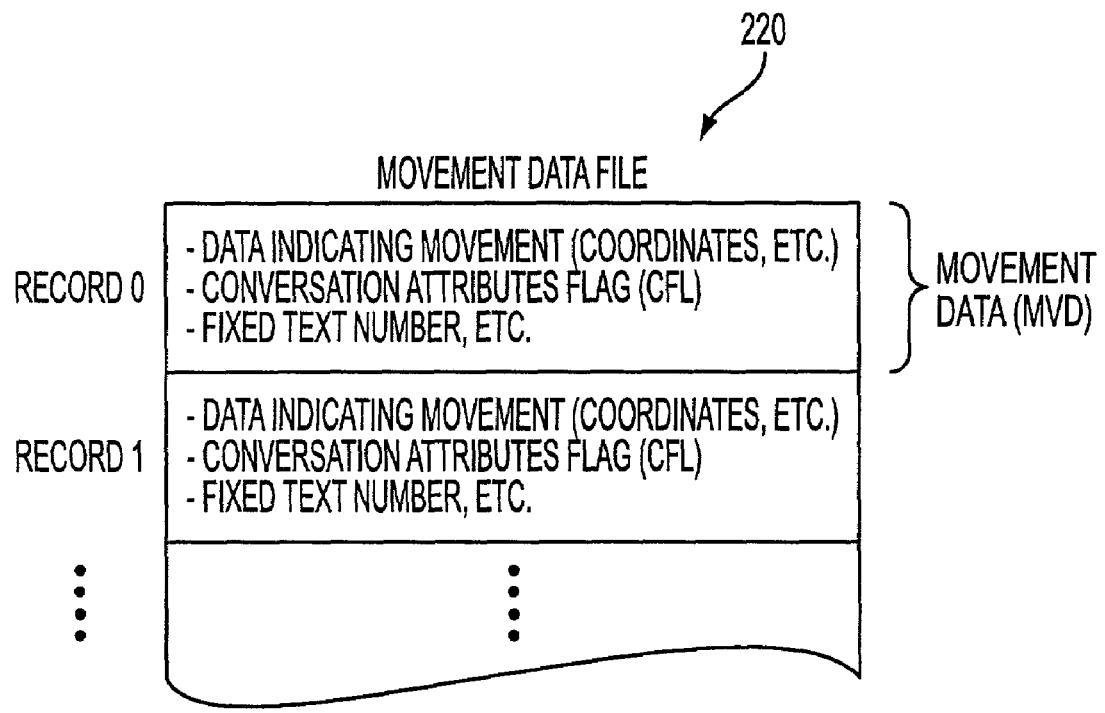
FIG. 16 is an explanatory diagram showing the itemization of the movement data table.
Figure 17:
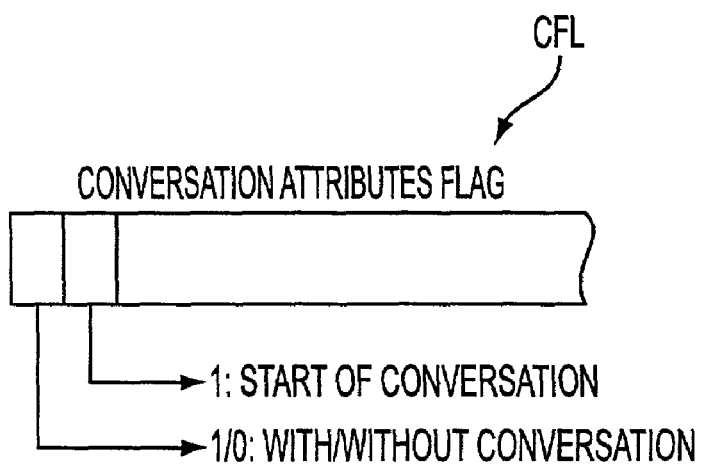
FIG. 17 is an explanatory diagram showing the itemization of the conversation attributes flag.

As shown in FIG. 16, the movement data MVD that comprises a movement data file 220 includes data (coordinates, etc.) that indicate the movement of character 210, a conversation attributes flag CFL, and a fixed text number, etc. As shown in FIG. 17, the conversation attributes flag CFL has bit information indicating the presence or absence of conversation text, and bit information indicating the start of a conversation. The fixed text number is, for example, the record number where the fixed text to be output is stored among the multiple records that comprise fixed text information table 222.

If the conversation to be output in the scene is contributed text and inserted text, because only one contributed text or inserted text can be registered for one item of scene information, the fixed text number is, for example, "FF" in hexadecimal notation.

Figure 18:
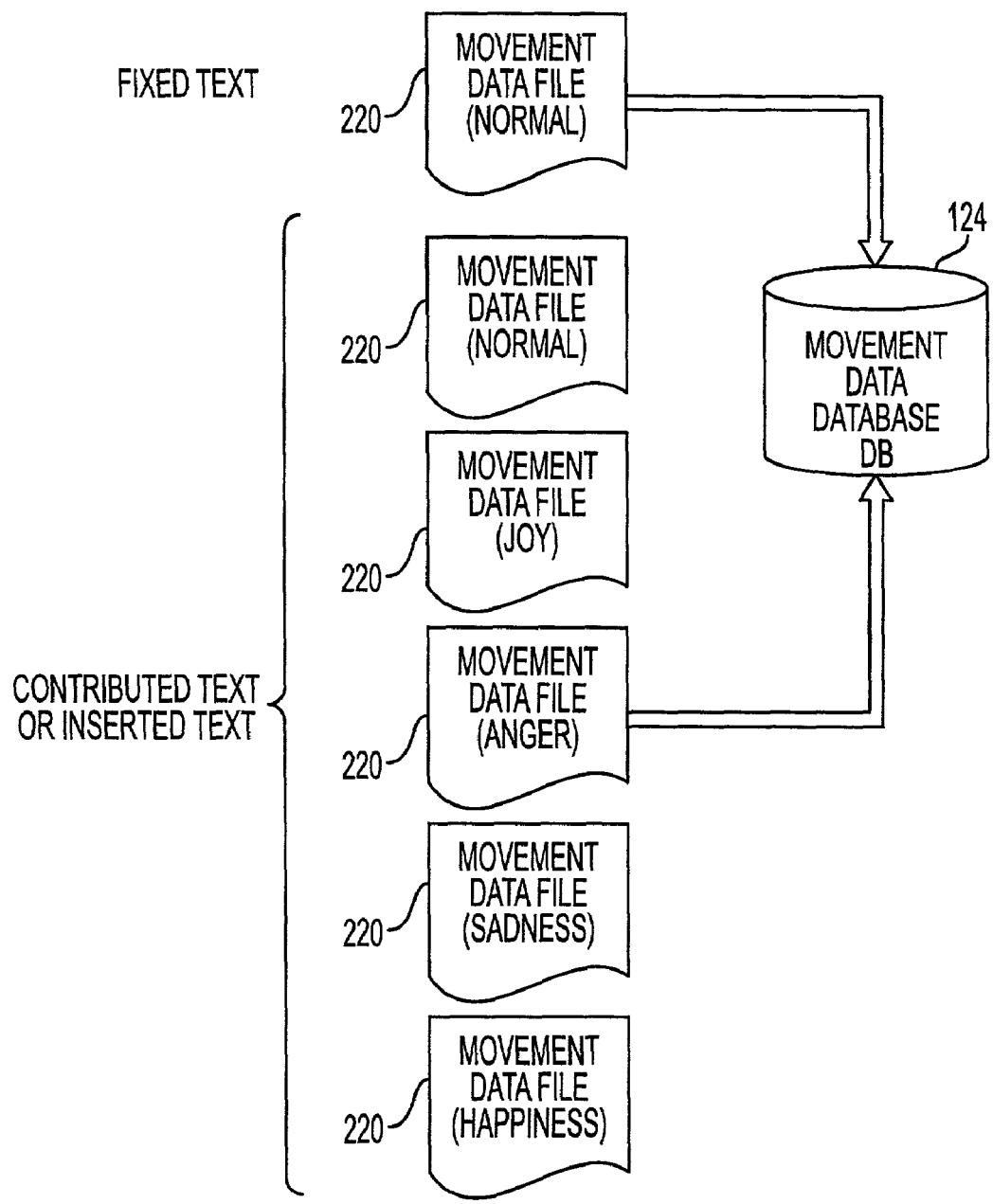
FIG. 18 is an explanatory diagram showing the method for storing movement data files in the movement data database.

As shown in FIG. 18, among the aforesaid movement data files 220, for the movement data file 220 in which is registered the movement data MVD for which the fixed text is to be output, only the movement data file 220 in which is registered the movement data MVD indicating the normal expression of character 210 is stored in movement data database 124. For a movement data file 220 in which is registered the movement data MVD for which a contributed text or inserted text is to be output, there are available a movement data file 220 in which is registered the movement data MVD indicating the normal expression of character 210, and four movement data files 220 corresponding to joy, anger, sadness, and happiness, and they are stored together in movement data database 124.

Registered in the four movement data files 220 corresponding to joy, anger, sadness, and happiness are, respectively, movement data MVD indicating the expression when character 210 is joyful, movement data MVD indicating the expression when character 210 is angry, movement data MVD indicating the expression when character 210 is sad, and movement data MVD indicating the expression when character 210 is happy.

In said step S4, as each scene is produced, scene information SI is stored respectively in scene information database 126. As stated above, scene information SI consists of background information BGI and one or more items of character information CI corresponding to the one or more characters that appear in the scene (see FIG. 6).

Background information BGI is attributes, etc. that specify the background image data BGD to be used. These attributes are codes, etc. that indicate the storage location (optical disk 20 or program information file 200). If said code indicates optical disk 20, this attribute is a number or address, etc. indicating the recording sequence on optical disk 20, and if said code indicates program information file 200, this attribute is the address, etc. where said background image data BGD is stored in the graphic data region GRZ in program information file 200.

Registered as character information CI are at least the object number of said character 210, the file attribute that specifies movement data file 220 (a number, or identification code, or address, etc. indicating the recording sequence on optical disk 20), and the conversation information CCI.

Figure 19:
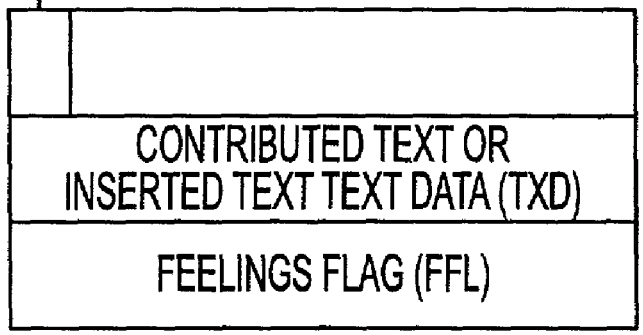
FIG. 19 is an explanatory diagram showing the itemization of the conversation information.
Figure 20:
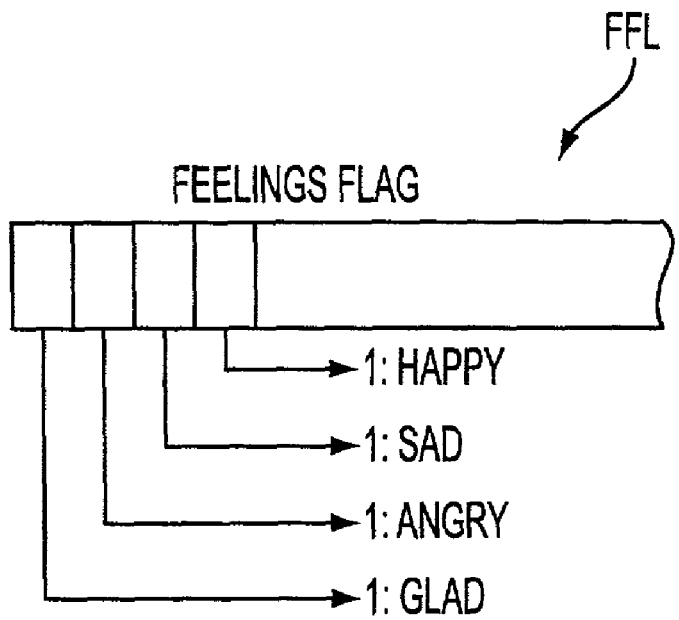
FIG. 20 is an explanatory diagram showing the itemization of the feelings flag.

As shown in FIG. 19, conversation information CCI consists of bit information indicating whether it is contributed or inserted text or rather fixed text, text data TXD of the contributed text or inserted text to be registered if this bit information indicates contributed or inserted text, and feelings flag FFL. As shown in FIG. 20, feelings flag FFL contains four bits of information corresponding to joy, anger, sadness, and happiness, and if the contributed text or inserted text is, for example, of happy content, the bit information corresponding to "happy" is set to "1".

In step S5 in FIG. 14, in producing a recording medium to be supplied to the market, for example optical disk 20 to be mounted on entertainment device 12, as shown in FIG. 13, the necessary computer program or the prescribed data is recorded on said optical disk 20 via formatter 130. The necessary computer program is, for example, a computer program that broadcasts a program on monitor 18 according to program information file 200 sent from server 104 to each entertainment system 10. Said prescribed data is, for example, object data stored in object data database 122 or multiple movement data files 220 stored in movement data database 124, or fixed text information table 222, etc. Also, said prescribed data is, for example, background image data BGD for each season or background image data BGD resembling a major city, that is, background image data BGD that can be used widely, not just limited to that day.

When optical disk 20 on which said computer program and prescribed data are recorded is supplied to the market, interested users obtain said optical disk 20 and, for example, perform the registration processing of transferring user information to server 104 via network 102. In this registration processing, if a user ID is issued to said user, said user is thereby registered as a legitimate member. The issued user ID is stored in customer control database 116 (see FIG. 4).

Figure 21:
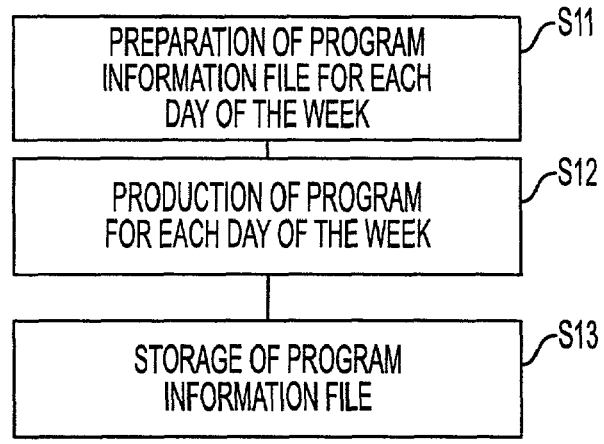
FIG. 21 is the first part of a process block diagram showing the program information editing processing.
Figure 22:
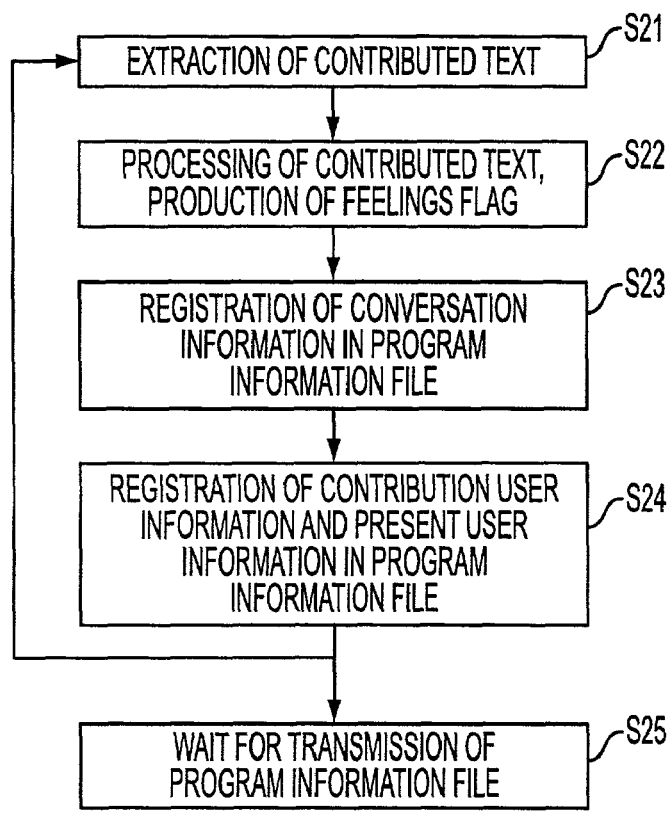
FIG. 22 is the second part of a process block diagram showing the program information editing processing.

Next we describe, with reference to FIGS. 21 and 22, an example of editing of program information done at site 106. As shown in FIG. 4, program information editing is done using program information editing computer 108. Connected to program information editing computer 108 are background image database 110, program information database 112, contributed text database 114, customer control database 116, and scene information database 126.

In editing program information, as shown in FIG. 21, first, in step S11, a program information file 200 for each day of the week is prepared. Then, in step S12, a program for each day of the week is produced.

In this program production, one sequence information SQI is produced by combining arbitrary items of scene information SI from the multiple items of scene information SI stored in scene information database 126. The background image data BGD for each scene information SI is determined according to the season or day of the week, etc., and is registered as background information BGI. In this case, if one is to use background image data BGD that can be widely used and is not limited to that day only, such as background image data BGD of a season or city, etc., background image data BGD recorded on optical disk 20 is selected, and on the other hand if one is to use background image data BGD for that day only, such as a concert notice or a commemorative day, etc., suitable background image data BGD is extracted from background image database 110. Then this background image data BGD is registered in graphic data region GRZ of program information file 200.

Then, repeating said operation, as shown in FIG. 7, a program is produced in which first sequence SQ1, second sequence SQ2, and third sequence SQ3 are arranged. Then these sequences SQ1, SQ2, SQ3 are each registered in their broadcast order in the corresponding program information file 200 as multiple items of sequence information SQI. At this stage, among the items of scene information SI that constitute each sequence information SQI, only scenes that output a fixed text are completed. In step S13 in FIG. 21, the produced program information files 200 are sequentially stored in program information database 112.

The processing of aforesaid steps S11-S13 need not be done every day, but can be done, for example, at the stage in which program information changes or on days when the season changes.

Next, we describe the program information editing that is put together at once or is done every day. First, in step S21 in FIG. 22, the contributed texts to be displayed in sequences SQ1, SQ2, and SQ3 to be broadcast in, for example, a program the following day are extracted from the contributed texts stored in contributed text database 114. The storage of contributed texts is discussed below.

Together with this operation of extracting contributed texts, present points for the users who transmitted said contributed texts are updated. When these present points reach a prescribed value, information is sent to the user informing him that he will be awarded a present.

Then, in step S22, the figures, etc. are adjusted for the extracted contributed text to fit the time width to be displayed, and this is made into the contributed text for display. At this time the relevant bits of the feelings flag FFL may be set according to the content of the contributed text. As shown in FIG. 20, four items of bit information corresponding to joy, anger, sadness, and happiness are included in this feelings flag FFL. If for example the contributed text is of happy content, the bit information corresponding to "happy" is set to "1". In this case, the contributed text may be adjusted to a happy content. If no joy, anger, sadness, or happiness is to be shown, each bit of the feelings flag FFL is set to "0".

If necessary, a comment on the extracted text is produced as an inserted text. In this case too, the relevant bits of feelings flag FFL are set to "1" or "0".

Then, in step S23, processing is done whereby said extracted contributed text or inserted text is registered in program information file 200 as conversation information CCI to be output by a specified character 210 in the relevant scene. That is, the contributed text or inserted text and the feelings flag FFL are registered as conversation information CCI of character information CI with respect to the relevant scene information SI in these contributed texts, etc. in the program information file 200 that corresponds to the day of the week of the following day. At this time, registration of conversation information CCI is achieved while confirming the movement data MVD of the relevant scene.

Then, in step S24, one registers contribution user information CUI concerning the contribution and present user information PUI concerning the present with respect to the program information file 200 to be transmitted the following day. This contribution user information CUI is the user ID of the user who sent the contributed text to be announced this time, and this present user information PUI is the user ID and user name of the user who has exceeded the prescribed present points, and the name of the present, etc. Registered in this present user information PUI as inserted text are the name of the user to be given the present and a message presenting it, etc.

At the stage when the processing in said step 24 ends, for example, editing of program information file 200 to be transmitted the following day ends. And in the following step S25, this program information file 200 is recorded in the prescribed region on a hard disk (not shown) that is connected to server 104, for example in a region accessed by a double buffer method, and one waits for transmission to each server.

Editing of program information is done by repeating aforesaid steps S21-S24. This editing processing may be done, for example, once a week all together, or the portion for each day may be done once a day. In particular, if the latter method is selected, opinions and impressions from users concerning topical contributed texts and cases arrive at each user the following day. This maintains the bulletin nature of the information, thereby making it possible to invoke the desire to have a look at the program once a day.

Next we describe, with reference to FIGS. 23-39, an example of software (program processing means 300) for realizing the aforesaid function, that is, the function of transmitting program information file 200 from server 104 to each user's entertainment system 10 and outputting on monitor 18 of entertainment system 10 a program consisting of information registered in said program information file 200 and information held in each entertainment system 10. As stated above, this program processing means is provided to entertainment device 12, via a network, from a random-access recording medium such as optical disk 20 or memory card 14 or hard disk 418. Here we proceed with the description assuming the case in which program processing means 300 runs after having been read into entertainment device 12 from optical disk 20.

Program processing means 300 is operated on CPU 401 by, for example, being downloaded into RAM 402 of entertainment device 12 through the prescribed processing from a specified optical disk 20 previously played on entertainment device 12.

Figure 23:
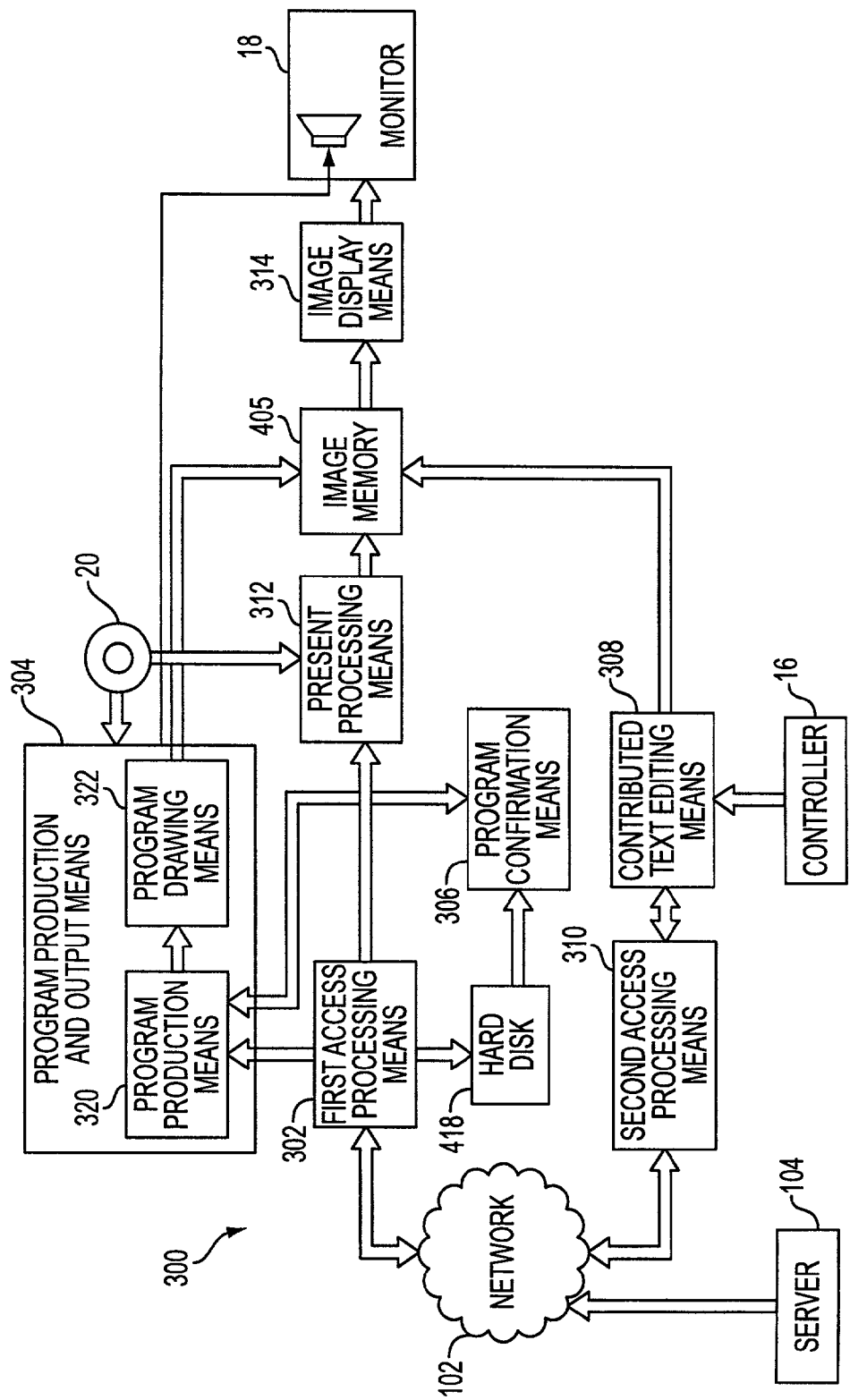
FIG. 23 is a functional block diagram showing the composition of a program processing means in accordance with this embodiment.

As shown in FIG. 23, this program processing means 300 has first access processing means 302, which accesses server 104 at least through network 102, receives program information file 200 transmitted from said server 104, and records it on hard disk 418, program production and output means 304, which outputs on monitor 18 a program that it produces by information of received program information file 200 and information recorded on, for example, optical disk 20, program confirmation means 306 for confirming a program seen once, contributed text editing means 308, which edits, as contributed text, messages input through controller 16, second access processing means 310, which accesses server 104 at least through network 102 and transmits contributed texts to said server 104, present processing means 312, which displays each user's present points and displays present receipt, etc. based on contribution user information CUI and present user information PUI registered in program information file 200 and image display means 314, which outputs to monitor 18 the image data drawn to image memory 405 and displays said image on the screen of said monitor 18.

Program production and output means 304 has program production means 320, which produces a program by means of the information of received program information file 200 and information recorded on, for example optical disk 20 and program drawing means 322, which draws to image memory 405 the images of the produced program. The program display means consists of this program drawing means 322 and image display means 314.

Next we describe, with reference to FIGS. 24-39, the processing operation of the program processing means 300. First, in step S101 in FIG. 24, this program processing means 300 displays a menu on screen 301 of monitor 18, as shown in FIG. 25. Arranged on this menu are items such as, for example, "1. Today's program", "2. Confirmation of already broadcast programs", "3. Contribution submission", "4. Present information".

Next, in step S102, one waits for operation input from controller 16. That is, one waits for the input of a menu item. Upon operation input, one proceeds to the next step S103 and decides whether the item "1. Today's program" has been selected. If the selected item is "1. Today's program", one proceeds to the next step S104 and decides whether it is a new display. If it is new, one proceeds to the next step S105 and enters processing by first access processing means 302.

Figure 26:
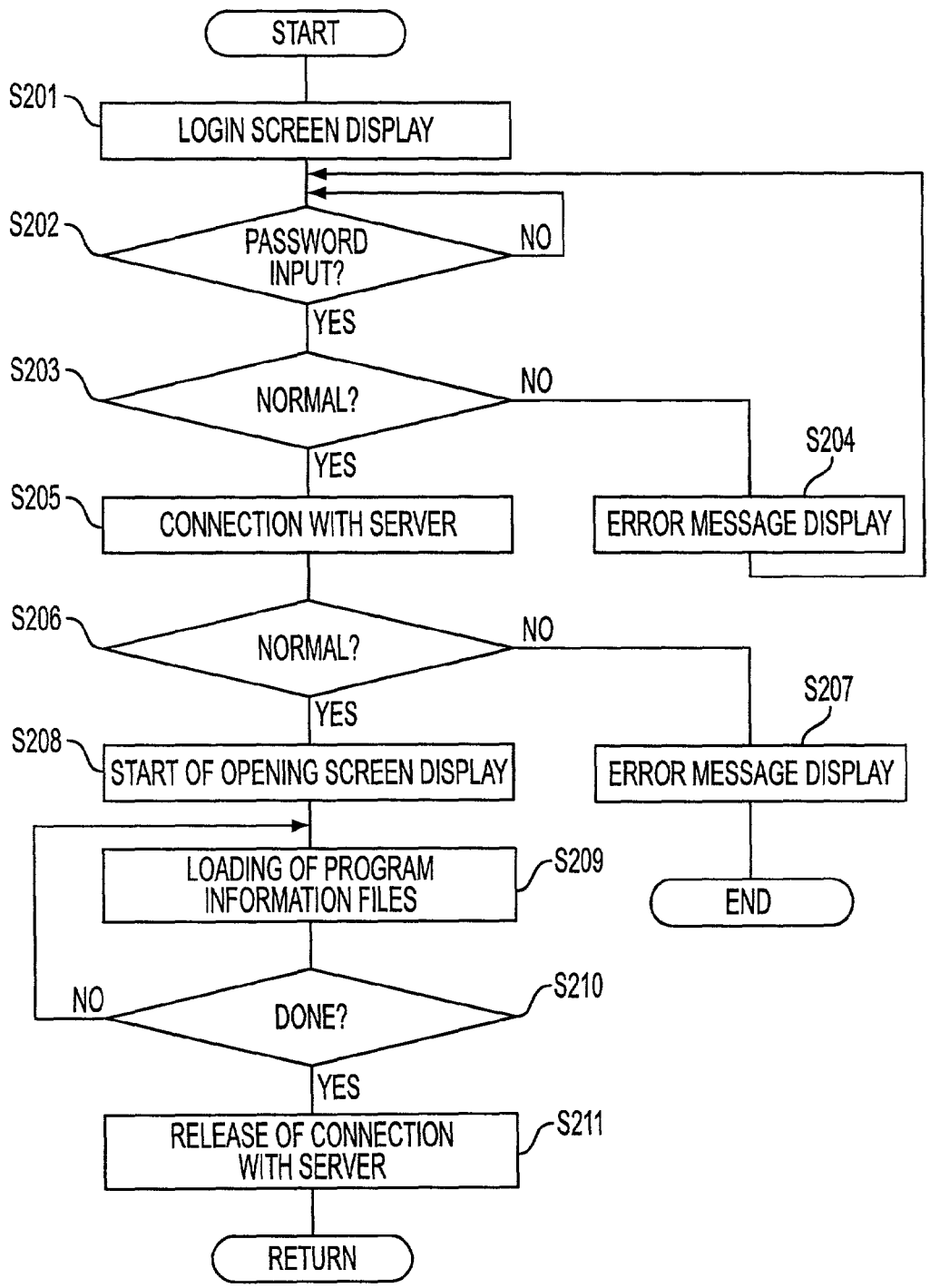
FIG. 26 is a flowchart showing the processing operation of the first access processing means.

In this first access processing, first, in step S201 in FIG. 26, one displays the login (request screen for making the connection with server 104) on the screen of monitor 18. Then, in step S202, one waits for input of the password via controller 16. Upon input of the password, one proceeds to the next step S203 and decides whether the password is correct, that is, whether it is the same as the legitimate password previously set by the user.

If the input password is not correct, one proceeds to step S204, displays an error message on the screen of monitor 18, returns again to aforesaid step S202, and waits for input of a password. Upon input of a correct password, one proceeds to the next step S205 and makes the connection with server 104.

Figure 27:
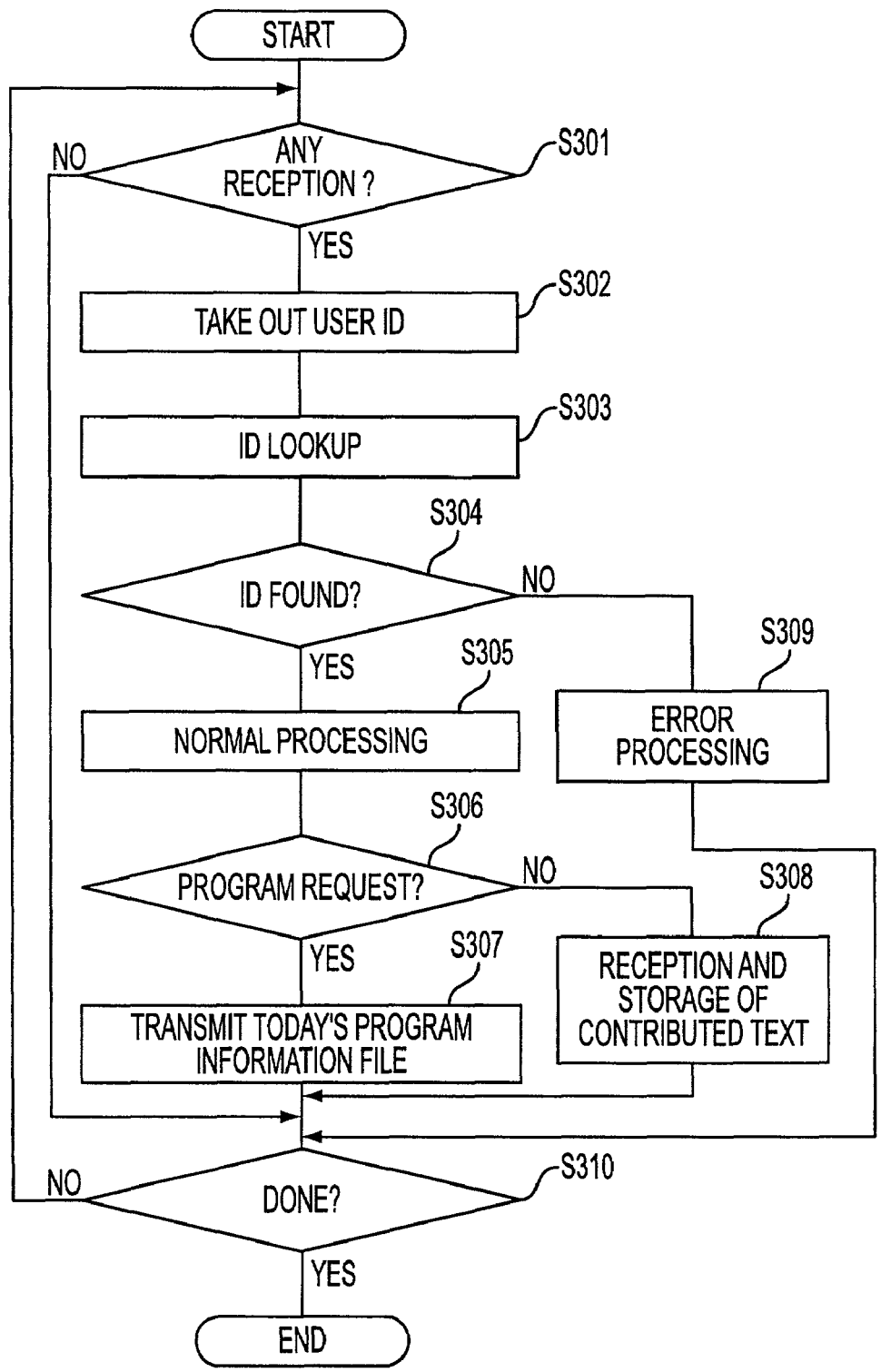
FIG. 27 is a flowchart showing the processing operation at the server.

Here we describe, with reference to the flowchart in FIG. 27, the processing operation of server 104. First, in step S301 in FIG. 27, server 104 decides whether there is any transmission to said server 104, that is, whether reception has been detected. If reception is detected, one proceeds to the next step S302 and extracts the user ID from the received data.

Next, in step S303, one looks up whether said extracted user ID is a user ID that is registered in customer control database 116 (see FIG. 4), and in the next step S304, one decides the lookup results. That is, one looks up whether the sender is a user who is legitimately registered with this network service.

In this step S304, upon deciding that it is a legitimate user, one proceeds to the next step S305 and performs normal processing. Specifically, a normal signal is sent to said sender. Then, in step S306, one decides whether the reception content this time is a program transmission request, that is, whether it is access by first access processing means 302.

If it is a program transmission request, one proceeds to the next step S307 and transmits to entertainment system 10 of said user the program information file 200 for today that has been recorded on the hard disk of server 104.

In said step S306, if it is not a program transmission request but a contributed text reception request, one proceeds to the next step S308, receives the contributed text sent from entertainment system 10 of said user, and stores it in contributed text database 114.

On the other hand, if in said step S304 it is decided that it is not a legitimate user, one proceeds to step S309 and performs error processing. Specifically, an error signal is sent to the sender, who is not a legitimate user.

Upon conclusion of the processing in said step S307, step S308, or step S309, one proceeds to the next step S310 and decides whether there is a program termination request (power cutoff or forcible termination, etc.) in response to the reception processing by this server 104. If there is no program termination request, one returns to aforesaid step S301 and repeats the processing beginning with said step S301. And upon a program termination request, the reception processing by server 104 comes to an end.

We return to the description of the routine in FIG. 26. In the next step S206, it is decided whether the connection with server 104 has been made normally. This decision is made according to whether a normal signal has been sent from server 104. If an error signal rather than a normal signal is sent from server 104, one proceeds to the next step S207, displays on the screen of monitor 18 an error message such as "Please register as a legitimate member.", and forcibly terminates the processing by this program processing means 300.

If in said step S206 it is decided that it is normal, one proceeds to the next step S208 and begins display of the opening image, for example an animation image. Next, in step S209, one loads the program information file 200 sent from server 104, and in the following step S210 one waits for the loading to end. During this time, the opening image is displayed on the screen of monitor 18.

Then, when loading of program information file 200 ends, in step S211, one releases the connection with server 104 (logout), and thereafter the processing by this first access processing means 302 ends.

Figure 24:
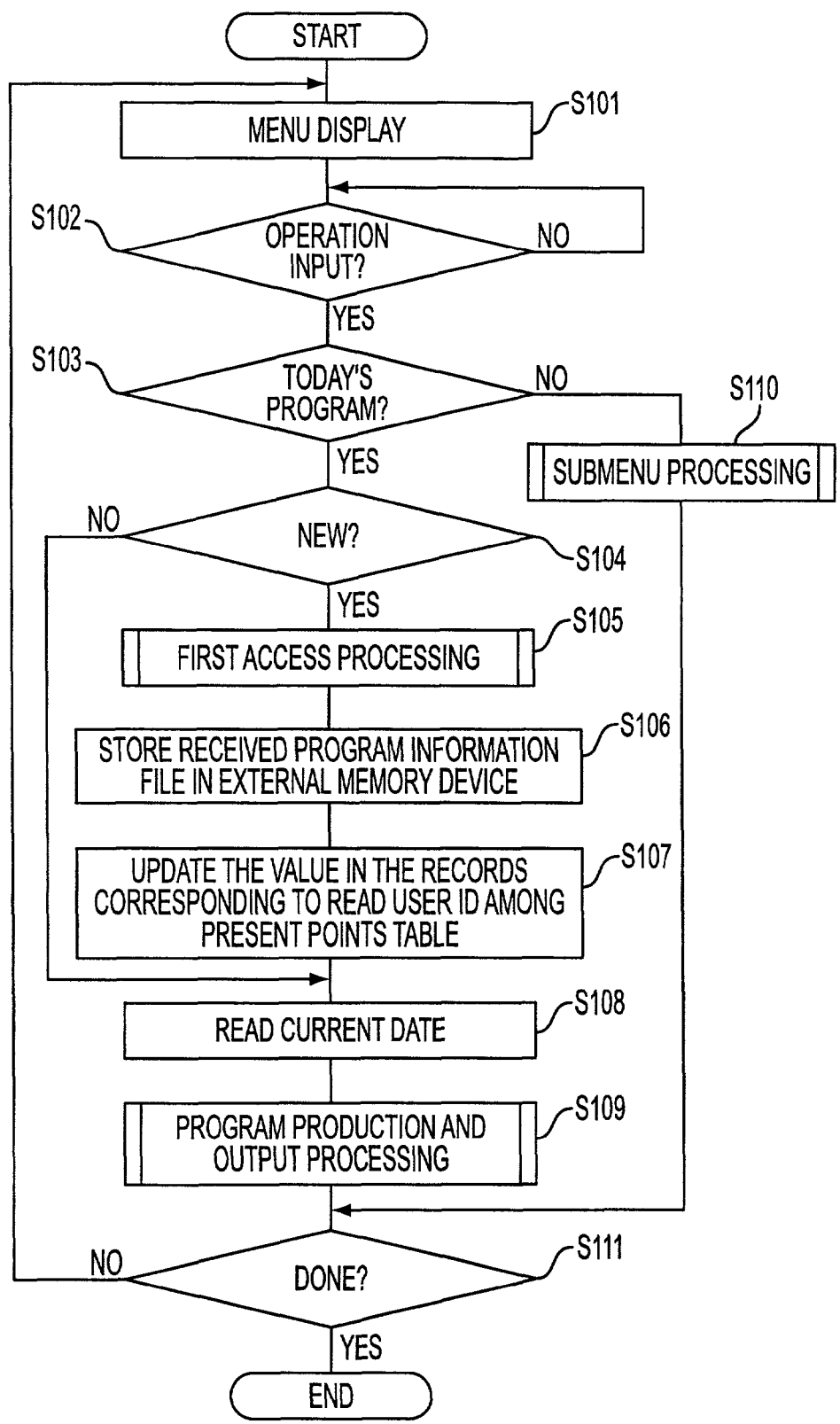
FIG. 24 is a flowchart showing the processing operation of a program processing means in accordance with this embodiment.
Figure 25:
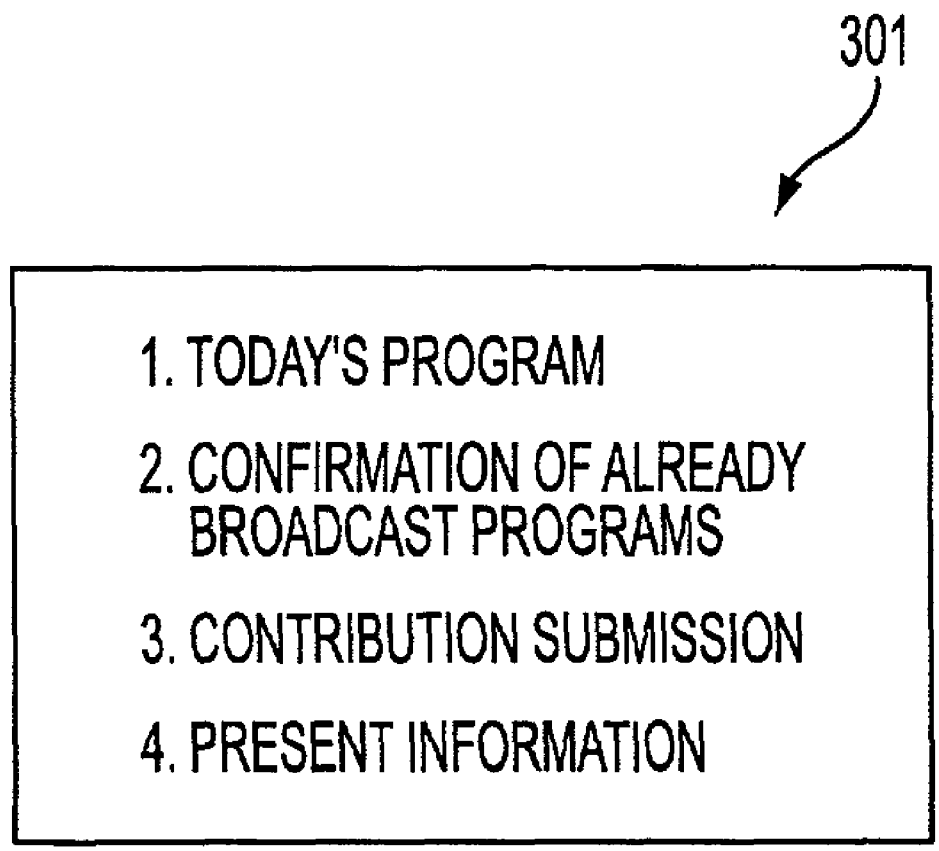
FIG. 25 is an explanatory diagram showing an example of the menu displayed on the monitor screen.

We return to the description of the main routine in FIG. 24. In the next step S106, program information file 200 received by said first access processing is stored in an external memory device, such as memory card 14 or hard disk 418. At this time, said program information file 200 is stored in an address corresponding to the current date.

Next, in step S107, one reads all the user IDs registered in the contribution user information CUI in said program information file 200. Then one updates the present points in the records corresponding to said read user IDs in the present points table shown in FIG. 28.

Next, when the processing in said step S107 comes to an end, or if in aforesaid step S104 it is decided that today's program has already been displayed, one proceeds to the next step S108 and reads the current date. Specifically, one reads the current date from, for example a real-time clock (RTC—not pictured), that is connected to bus 403 of entertainment device 12.

Then, in step S109, one enters processing by program production and output means 304. In the processing by this program production and output means 304, first, in step S401 in FIG. 29, index register "i," which is used for looking up sequence information SQI, is initialized by storing initial value "0" in said index register "i."

Then, in step S402, by means of program production means 320, one reads the i-th sequence information from the program information file 200 corresponding to the requested date among the one or more program information files 200 stored in the external memory device. This requested date is the current date if one requests today's program, and is a date arbitrarily selected by the user from the calendar if one requests confirmation of an already broadcast program.

Next, in step S403, one initializes index register "j," which is used for looking up scene information SI, by storing initial value "0" in said index register "j." Then, in step S404, by means of program production means 320, one reads the j-th scene information from said sequence information SQI.

Next, in step S405, the background image is determined by means of program production means 320. Specifically, one reads the background image data BGD stored in the location indicated by the attributes from among the background information BGI registered in scene information SI. That is, if the code included in said attributes that indicates the storage location indicates optical disk 20, then background image data BGD is read from the location corresponding to the number or address, etc. in optical disk 20 included in said attributes, and if, on the other hand, the code included in said attributes that indicates the storage location indicates a program information file 200, then background image data BGD is read from the location in graphic data region GRZ of the program information file 200 that corresponds to the number or address, etc. included in said attributes.

In step S406, said read-out background image data BGD is drawn to image memory 405 by program drawing means 322.

Next, in step S407, index register "m," which is used for looking up movement data, is initialized by storing initial value "0" in said index register "m." Next, in step S408, index "k," which is used for looking up character information CI, is initialized by storing initial value "0" in said index register "k."

Next, in step S409, the k-th character information CI is read from said scene information SI by program production means 320. Then, in step S410, object data that corresponds to the object number included in said character information CI is read by means of program production means 320 from among the many items of object data stored on optical disk 20.

Figure 30:
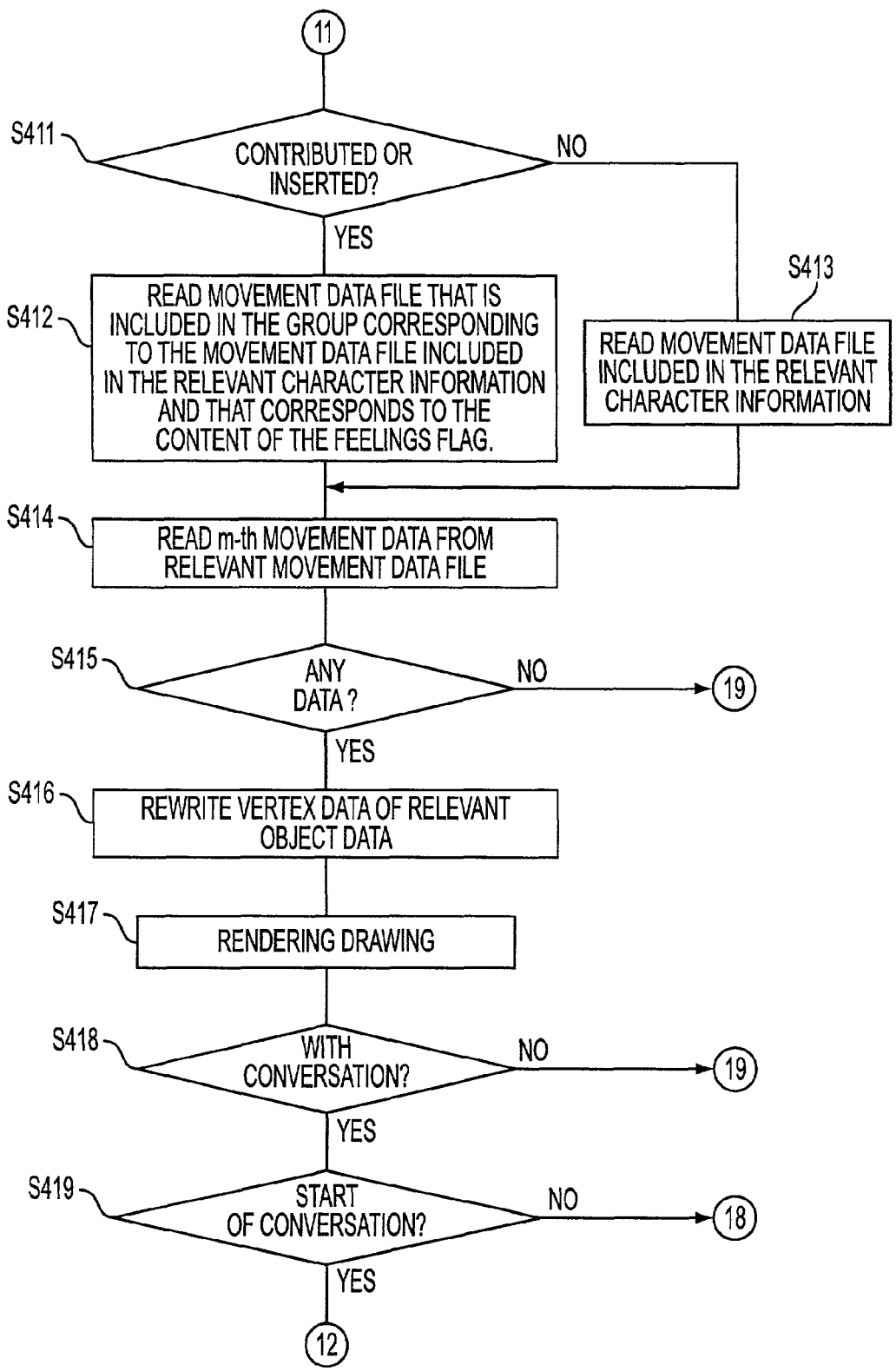
FIG. 30 is the second part of a flowchart showing the processing operation of the program production and output means.

Next, in step S411 in FIG. 30, it is decided whether conversation information CCI included in said character information CI indicates contributed or inserted text. If it indicates contributed or inserted text, in the next step S412, the movement data file 200 that is included in the group corresponding to the movement data file number included in said character information CI and that corresponds to the content of feelings flag FFL is read by means of program production means 320. For example, if all the bit information of feelings flag FFL is "0", which indicates "normal", then the movement data file 200 that indicates "normal" is read from among the five movement data files 220 shown in FIG. 18, and if the bit information of feelings flag FFL indicates "happy", then the "happy" movement data file 200 is read from among the five movement data files 220 shown in FIG. 18.

In said step S411, if it is decided that conversation information CCI is a fixed text or is without conversation, one proceeds to step S413 and reads, by means of program production means 320, the movement data file 220 that corresponds to the movement data file number included in said character information CI.

When the processing in said step S412 or the processing in step S413 comes to an end, one proceeds to the next step S414 and reads, by means of program production means 320, the m-th movement data from said read movement data file 220, then, in step S415, it is decided whether all of the movement data has been read, that is, whether the read data is EOD (end of data).

If the read data is not EOD but is movement data, one proceeds to the next step S416 and by means of program drawing means 322 rewrites the vertex data of said object data based on movement-indicating data (coordinates, etc.) included in said movement data. Then, in step S417, a 3D image concerning said character 210 is drawn to image memory 405 by means of rendering processing.

Next, in step S418, it is decided whether there is a conversation in said movement data. This decision is made by whether the bit information of the conversation attributes flag CFL included in said movement data indicates "there is a conversation".

If "there is a conversation", one proceeds to the next step S419, and it is decided whether this time is the start of the conversation. This decision too is made by whether the bit information of the conversation attributes flag CFL included in said movement data indicates "start of conversation".

Figure 31:
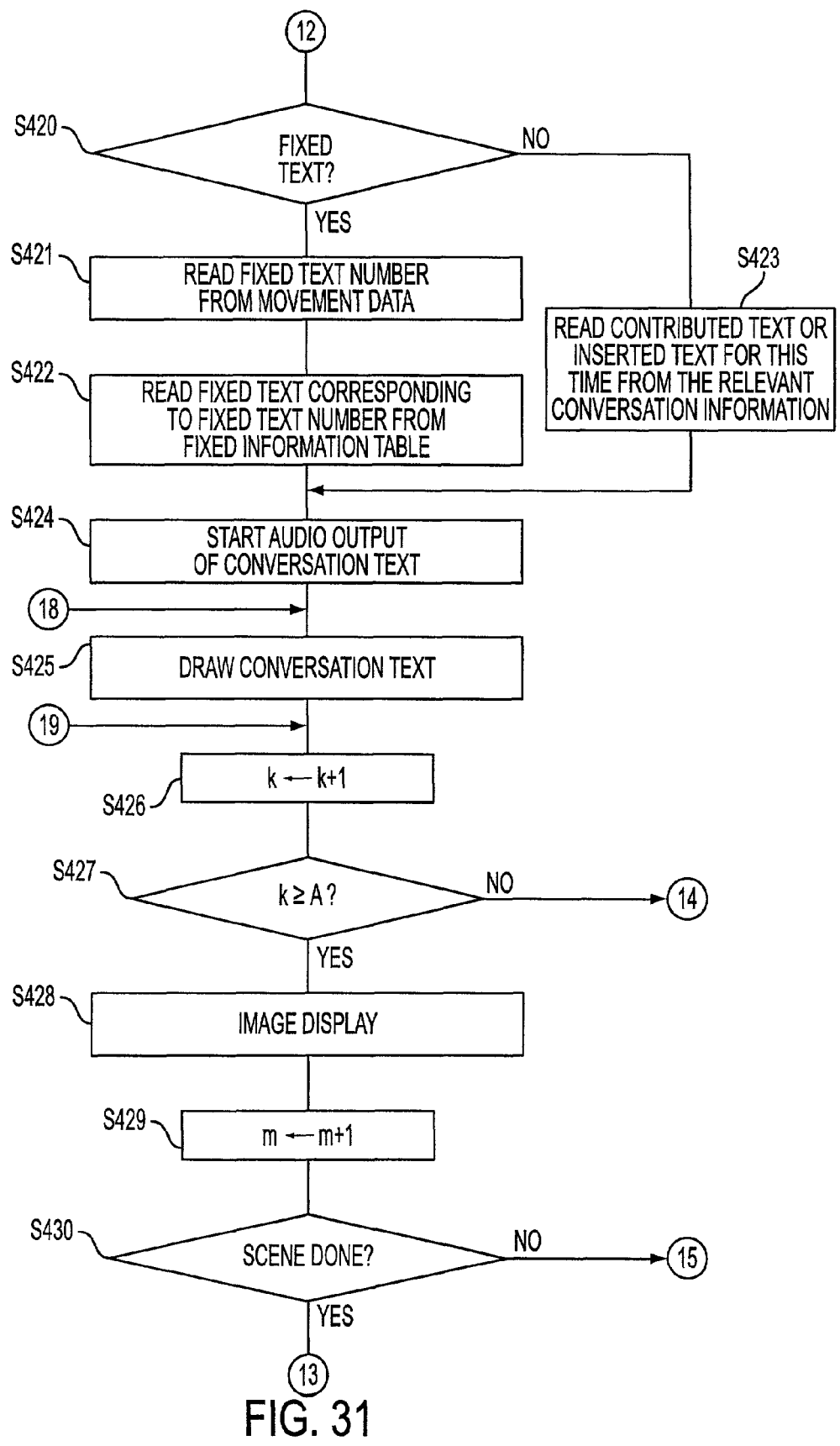
FIG. 31 is the third part of a flowchart showing the processing operation of the program production and output means.
Figure 32:
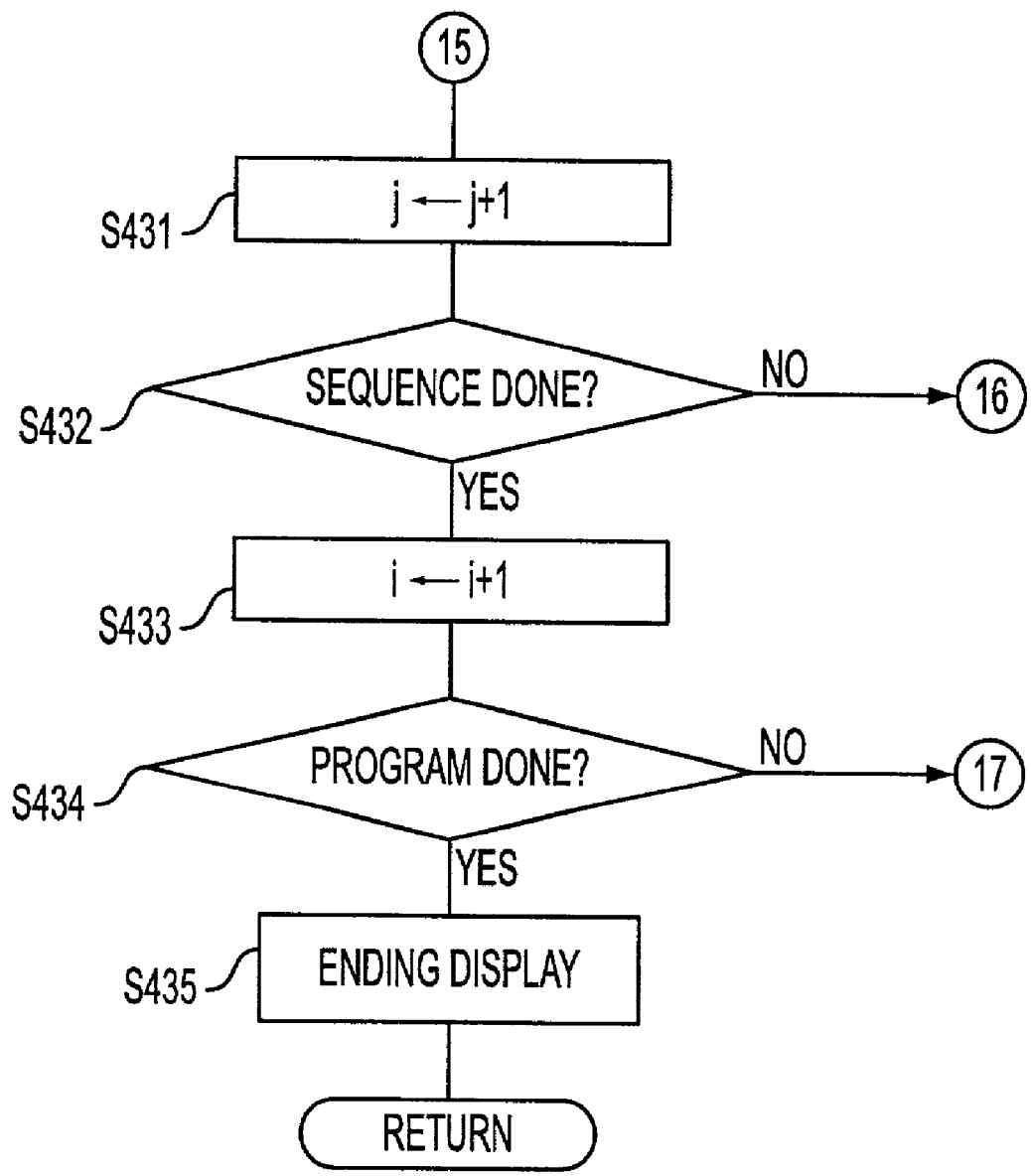
FIG. 32 is the fourth part of a flowchart showing the processing operation of the program production and output means.

In the case of "start of conversation", one proceeds to step S420 in FIG. 31, and it is decided whether the conversation this time is a fixed text. If it is a fixed text, one proceeds to the next step S421, reads the fixed text number from said movement data by means of program production means 320, then, in step S422, reads the fixed text that corresponds to the fixed text number this time from fixed text information table 222. On the other hand, if in aforesaid step S420 it is decided that it is not a fixed text, then in the next step S423 one reads this time's contributed text or inserted text from said conversation information CCI by means of program production means 320.

When the processing in said step S422 or the processing in step S423 comes to an end, one proceeds to the next step S424 and begins output of the audio of said conversation text (fixed text, or contributed text or inserted text). In this way, said conversation text is emitted from speaker 414 of monitor 18 at approximately the same time as the image display (including display of the conversation text) in step S428 discussed below.

When the processing in said step S424 comes to an end, or if it is decided in step S419 that it is in the midst of a conversation, one proceeds to step S425 in FIG. 31 and draws said conversation text, including dialog balloons, to image memory 405.

When the processing in said step S425 comes to an end, or if it is decided in step S418 that it is without conversation, or if it is decided in step S415 that it is without movement data, one proceeds to step S426 and updates the value of index register "k" by "+1". Then, in the next step S427, it is decided whether image drawing processing has ended for all characters 210. This decision is made according to whether the value of index register "k" is greater than or equal to this time's number of characters A.

Figure 29:
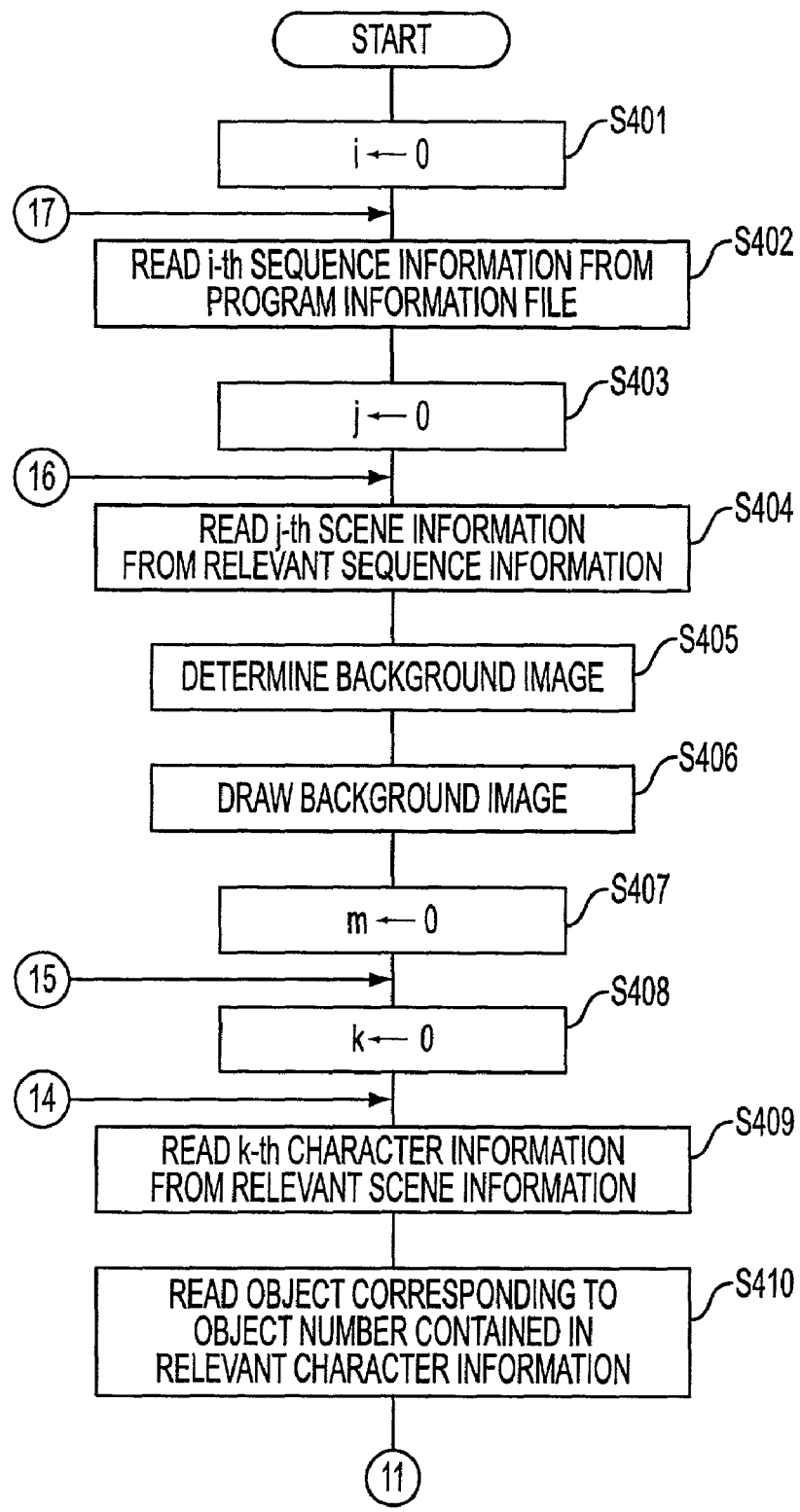
FIG. 29 is the first part of a flowchart showing the processing operation of the program production and output means.

If the value of index register "k" is less than the number of characters A, one returns to aforesaid step S409 in FIG. 29 and performs drawing processing for the next character 210, and when the value of index register "k" becomes greater than or equal to the number of characters A, one proceeds to step S428 in FIG. 31 and outputs to monitor 18 the image data drawn to image memory 405 by means of image display means 314.

Next, in step S429, after updating the value of index register "m" by "+1", in the next step S430, it is decided whether one scene has ended.

If the movement display and conversation output for said scene has not come to an end, one returns to aforesaid step S408 in FIG. 29, and the processing beginning with said step S408 is performed. That is, drawing based on the next movement data is done respectively for all characters. When the movement display and conversation output for said scene comes to an end, one proceeds to step S431 in FIG. 32 and updates the value of index register "j" by "+1". Then, in the next step S432, it is decided whether one sequence has come to an end.

If the movement display and conversation output for said sequence has not come to an end, one returns to aforesaid step S404 in FIG. 29, and the processing beginning with said step S404 is performed. That is, movement display and conversation output for all characters is done for the next scene. When the movement display and conversation output for said sequence comes to an end, one proceeds to step S433 in FIG. 32 and updates the value of index register "i" by "+1". Then, in the next step S434, it is decided whether processing has come to an end for all the sequences that comprise the program this time.

If the movement display and conversation output for all sequences has not come to an end, one returns to aforesaid step S402 in FIG. 29, and the processing beginning with said step S402 is performed. That is, movement display and conversation output is done for the next sequence. And when the movement display and conversation output for all sequences comes to an end, one proceeds to step S435 in FIG. 32, displays the ending image, for example an animation image, for the prescribed time, and processing by this program production and output means 304 ends.

We return to the description of the main routine in FIG. 24. In the next step S103, if it is decided that the selected item is not "1. Today's program", one proceeds to step S110 and enters submenu processing.

Figure 33:
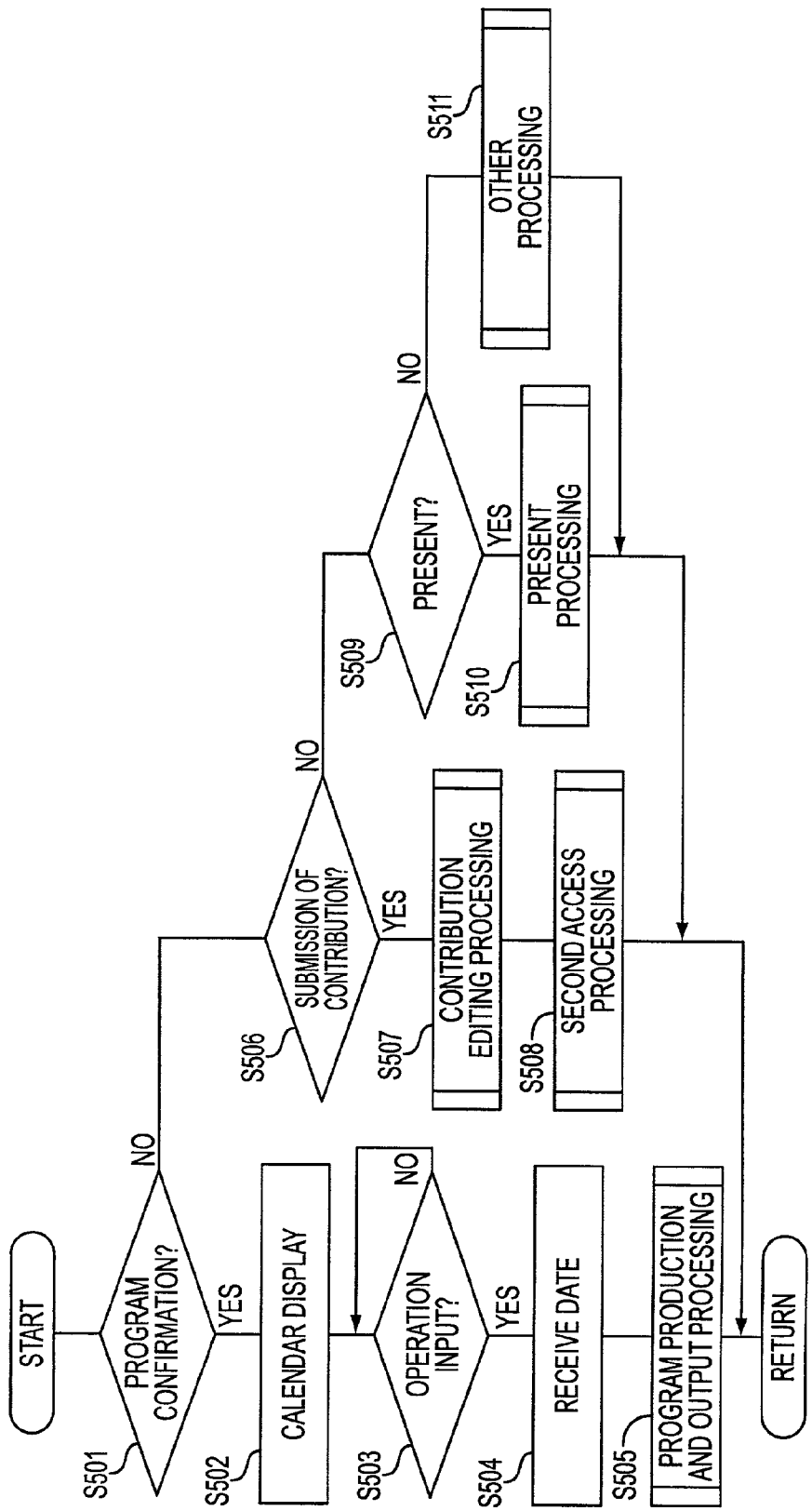
FIG. 33 is a flowchart showing the submenu processing.

In this submenu processing, as shown in FIG. 33, in step S501 it is decided whether the selected item is "2. Confirmation of already broadcast programs". If the item is "2. Confirmation of already broadcast programs", one proceeds to the next step S502 and displays a calendar on the screen of monitor 18. Then, in step S503, one waits for operation input from controller 16. That is, one waits for input of the date. Upon operation input, one proceeds to the next step S504 and receives the requested date. Then, in the next step S505, one enters processing by program production and output means 304. At this time, if a date farther in the future than the present is selected or if a date is specified that is prior to this network service being executed, an error message is displayed. As this error message, for example an error message is displayed to the effect that one should input a date within a specified range.

Processing by program production and output means 304 results in a program concerning the requested date being displayed on the screen of monitor 18. This processing has already been described, so it will not be described here.

If in aforesaid step S501 it is decided that it is not "2. Confirmation of already broadcast programs", one proceeds to the next step S506, and it is decided whether the selected item is "3. Contribution submission". If the item is "3. Contribution submission", one proceeds to the next step S507 and enters processing by contributed text editing means 308.

Figure 34:
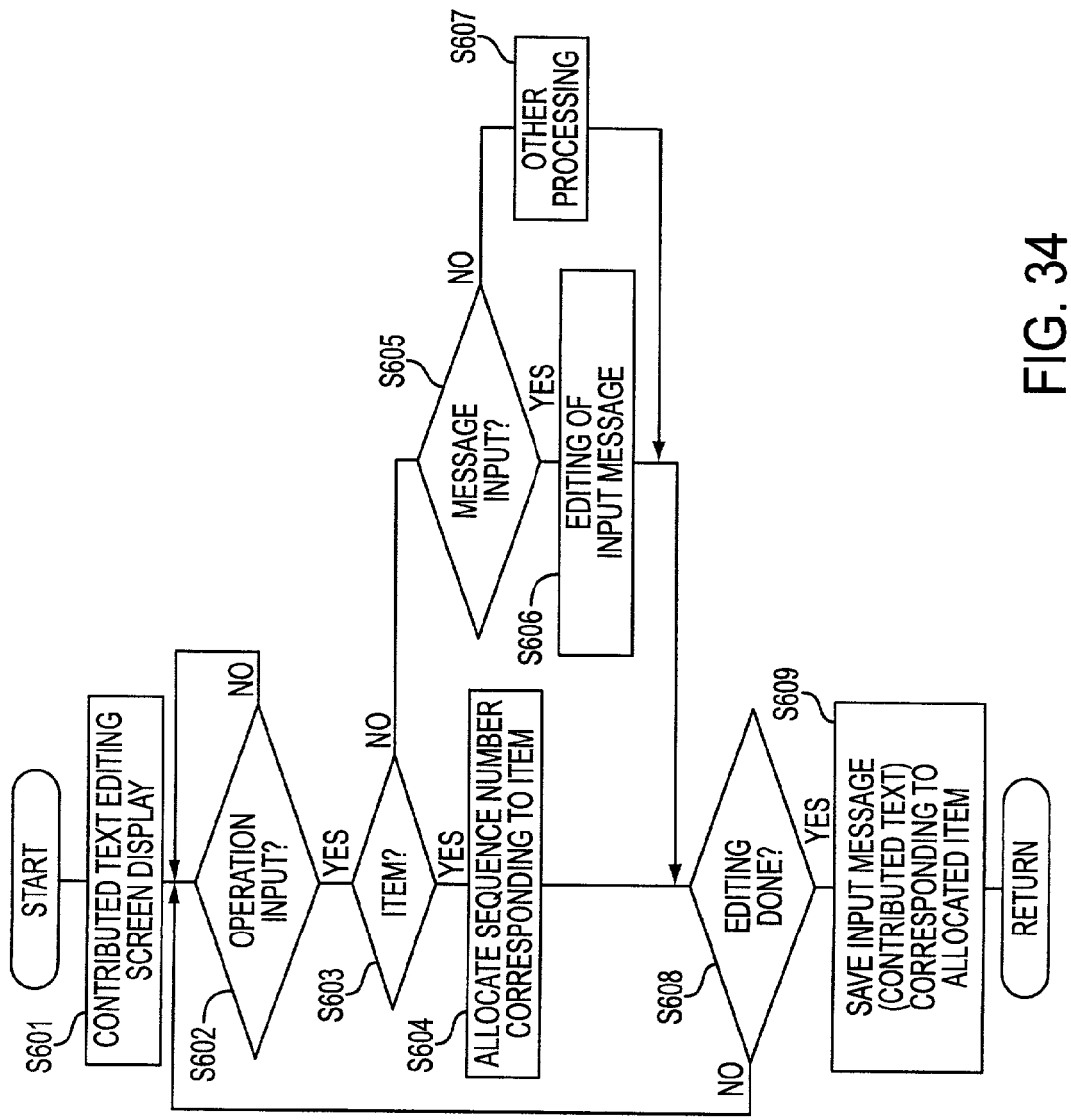
FIG. 34 is a flowchart showing the processing operation of the contributed text editing means.

In processing by this contributed text editing means 308, first, in step S601 in FIG. 34, one displays a screen for contributed text editing on the screen of monitor 18. Then, in step S602, one waits for operation input form controller 16. That is, one waits for input of an item concerning a sequence or of a contributed text.

Next, in step S603, it is decided whether said operation input is input of an item concerning a sequence. If it is an item concerning a sequence, one proceeds to the next step S604 and allocates a sequence number that corresponds to the item that has been input.

In said step S603, if it is decided that it is not an item concerning a sequence, one proceeds to step S605, and it is decided whether it is message input. If it is message input, one proceeds to the next step S606 and performs editing of the input message. This message editing includes input, correction, and deletion, etc. of the contributed text. Also, if in said step S605 it is decided that it is not message input, one proceeds to the next step S607, and other processing corresponding to the operation input is performed.

Upon completion of the processing in aforesaid step S604, step S606, or step S607, one proceeds to the next step S608, and it is decided whether editing of the contributed text has ended. This decision is made by, for example, whether an icon such as "editing completed", not shown, that is displayed on the screen of monitor 18 has been operated.

If editing has not ended, one proceeds to aforesaid step S602 and waits for the next operation input.

When editing has ended, one proceeds to the next step S609 and saves the allocated items and input messages (contributed texts) that correspond to these items in a file for transmission.

Upon completion of the processing in aforesaid step S609, processing by this contributed text editing means 308 comes to an end.

We return to the description of the routine in FIG. 33. In the next step S508, we enter processing by second access processing means 310. In the processing by this second access processing means 310, first, in step S701 in FIG. 35, one waits for input of a password via controller 16. Upon input of a password, one proceeds to the next step S702, and it is decided whether the password that has been input is correct, that is, whether the password that has been input is the same as the legitimate password previously set by the user.

If the input password is not correct, one proceeds to step S703, displays an error message on the screen of monitor 18, returns again to aforesaid step S701, and waits for input of a password. Upon input of a correct password, one proceeds to the next step S704 and makes the connection with server 104.

As shown in FIG. 27, at server 104, in step S303 one looks up whether the sender is a user legitimately registered with this network service, and upon deciding that he is a legitimate user, a normal signal is sent to said sender (step S305). Also, one receives the contributed text sent from entertainment system 10 of said user and stores it in contributed text database 114 (step S308).

If in step S304 it is decided that he is not a legitimate user, error processing is done as stated above.

Figure 35:
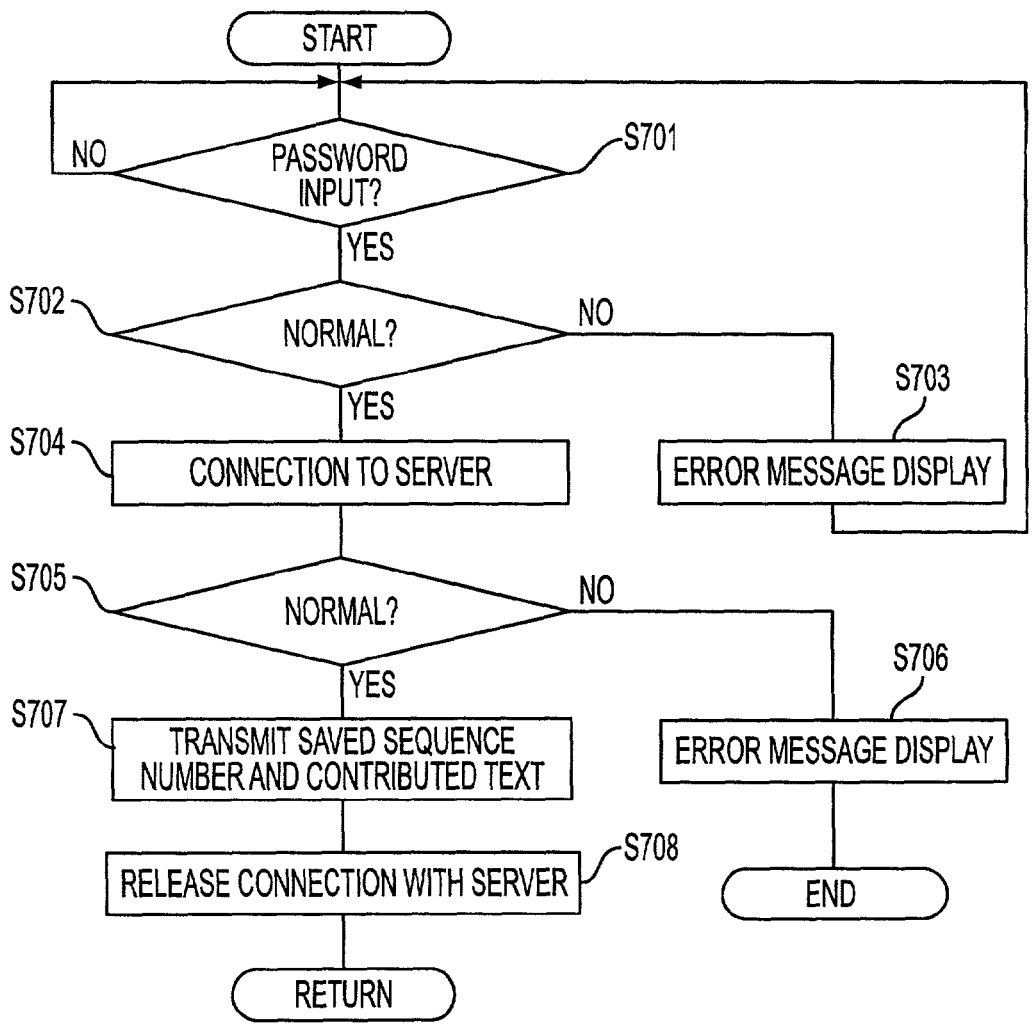
FIG. 35 is a flowchart showing the processing operation of the second access processing means.

We return to the description of the routine in FIG. 35. In the next step S705, it is decided whether the connection with server 104 has been made normally. This decision is made according to whether a normal signal has been sent from server 104. If an error signal rather than a normal signal is sent from server 104, one proceeds to the next step S706. In this step S706, one displays on the screen of monitor 18 an error message such as "Please register as a legitimate member.", and forcibly terminates the processing by this program processing means 300.

If in said step S705 it is decided that it is normal, one proceeds to the next step S707 and transmits to server 104 the sequence numbers and contributed texts that have been saved in the file for transmission. At server 104, as stated above, in step S308 one receives the sequence numbers and contributed texts and saves them in contributed text database 114. When transmission of said contributed texts, etc. ends, then, in step S708, one releases the connection with server 104 (logout), and thereafter the processing by this second access processing means 310 ends.

We return to the description of the routine in FIG. 33. If in said step S506 the selected item is judged not to be "3. Contribution submission", one proceeds to step S509, and this time it is judged whether the selected item is "4. Present information". If it is "4. Present information", one proceeds to the next step S510 and enters processing by present processing means 312.

Figure 36:
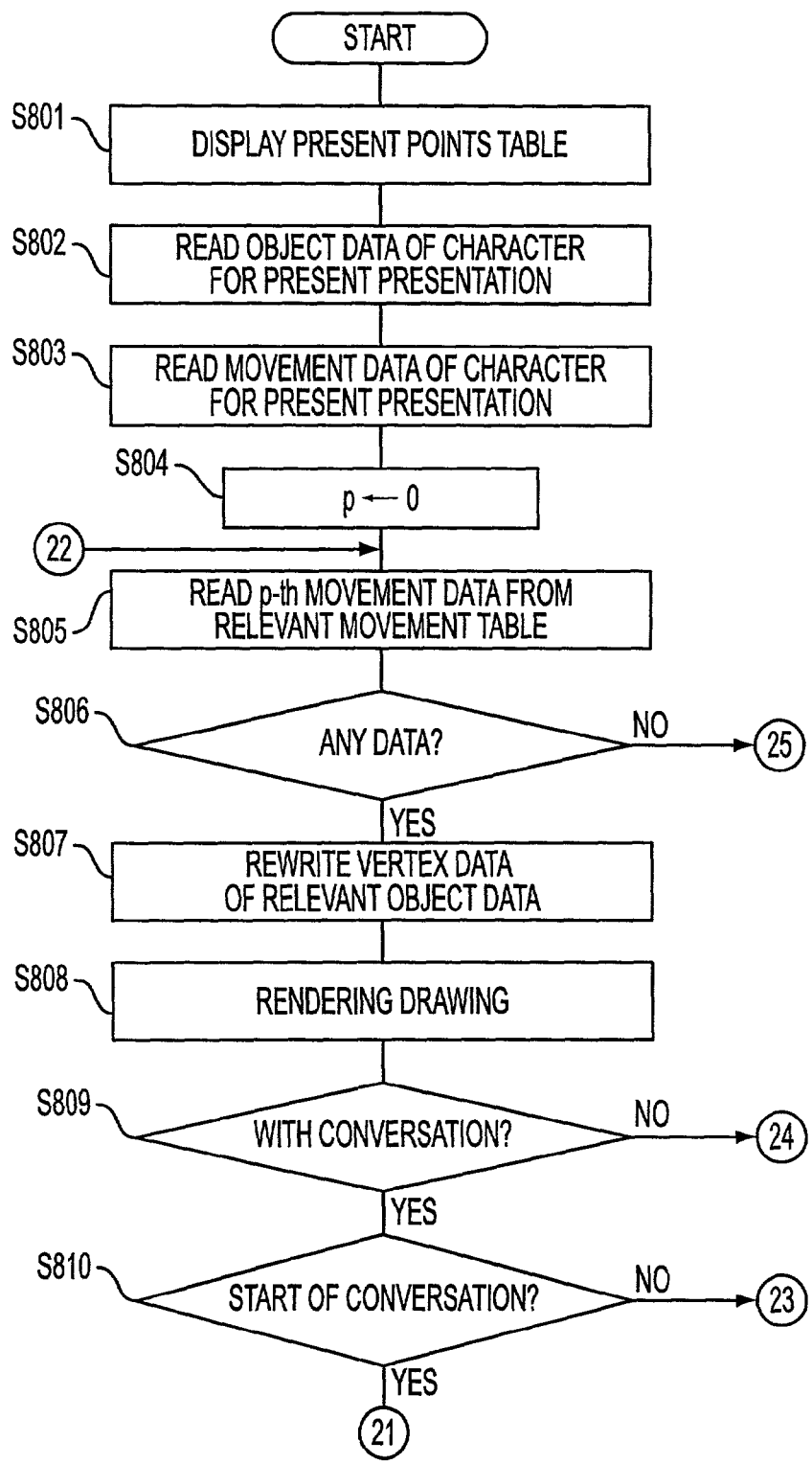
FIG. 36 is the first part of a flowchart showing the processing operation of the present processing means.

In processing by this present processing means 312, first, in step S801 in FIG. 36, one displays a present points table (see FIG. 28) on the screen of monitor 18. In this display, user names and points are displayed, and user IDs are in a hidden form.

Next, in step S802, the object data of a character for present presentation is read from optical disk 20. Then, in step S803, movement data file 220 of the character for present presentation is read from optical disk 20.

Next, in step S804, index register "p," which is used for looking up movement data, is initialized by storing initial value "0" in said index register "p."

Next, in step S805, one reads the p-th movement data from said movement data file 220, then, in step S806, it is decided whether all of the movement data has been read, that is, whether the read data is EOD (end of data).

If the read data is not EOD but is movement data, one proceeds to the next step S807 and rewrites the vertex data of said object data based on movement-indicating data (coordinates, etc.) included in said movement data. Then, in step S808, a 3D image concerning said character is drawn to image memory 405 by means of rendering processing.

Next, in step S809, it is decided whether there is a conversation in said movement data. This decision is made by whether the bit information of the conversation attributes flag CFL included in said movement data indicates "there is a conversation".

If "there is a conversation", one proceeds to the next step S810, and it is decided whether this time is the start of the conversation. This decision too is made by whether the bit information of the conversation attributes flag CFL included in said movement data indicates "start of conversation".

Figure 37:
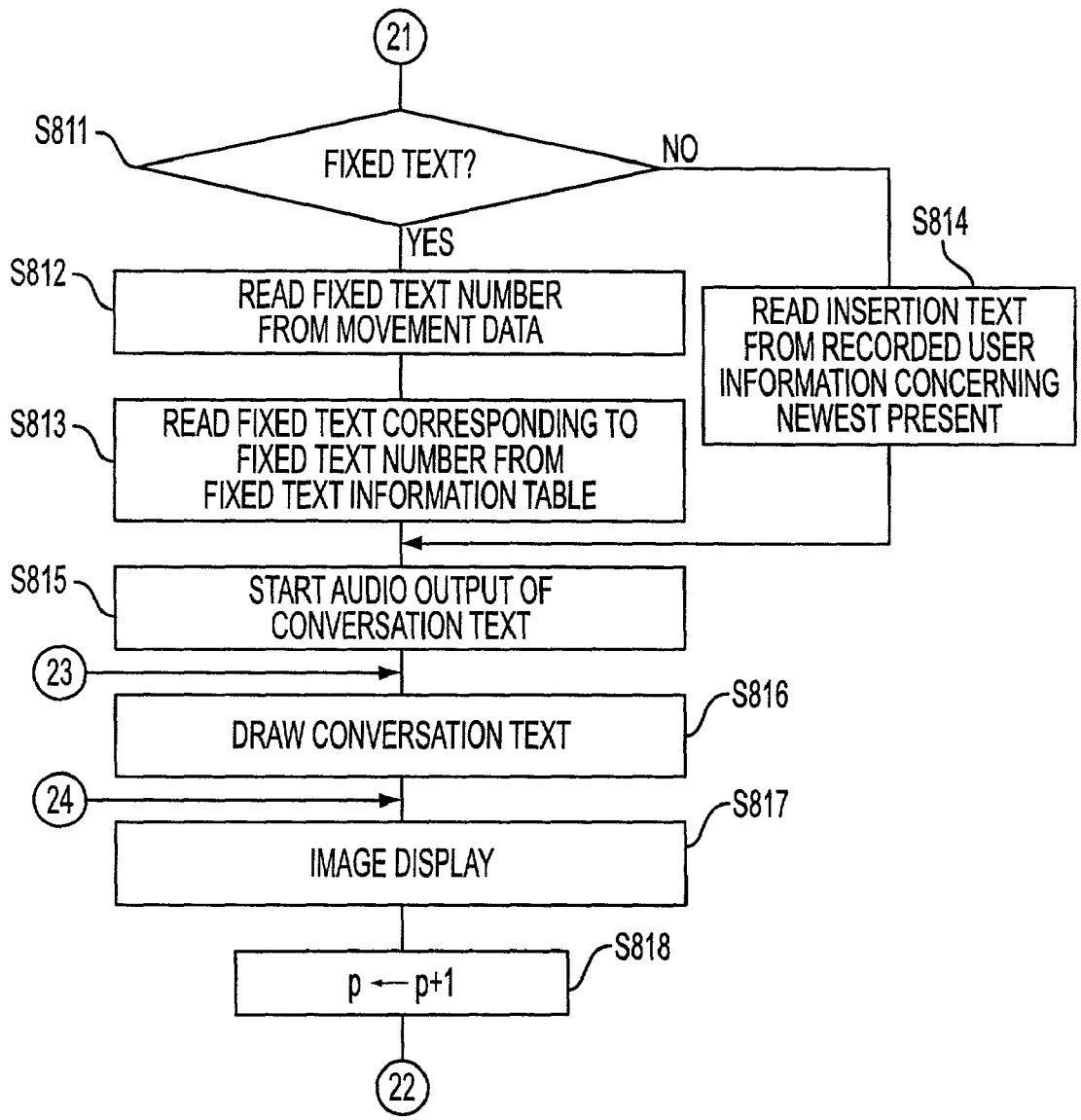
FIG. 37 is the second part of a flowchart showing the processing operation of the present processing means.

In the case of "start of conversation", one proceeds to step S811 in FIG. 37, and it is decided whether the conversation is a fixed text. If it is a fixed text, one proceeds to the next step S812, reads the fixed text number from said movement data, then, in step S813, reads the fixed text that corresponds to the fixed text number this time from fixed text information table 222. On the other hand, if in aforesaid step S811 it is decided that it is not a fixed text, then one reads an inserted text from the present user information PUI in the last program information file 200 among the program information files 200 recorded on hard disk 418.

When the processing in said step S813 or step S814 comes to an end, one proceeds to the next step S815 and begins output of the audio of said conversation text (fixed text or inserted text). In this way, said conversation text is emitted from, for example, speaker 414 attached to monitor 18 at approximately the same time as the image display (including display of the conversation text) in step S817 discussed below.

When the processing in said step S815 comes to an end, or if it is decided in step S810 that it is in the midst of a conversation, then in step S816 one draws said conversation text, including dialog balloons, to image memory 405.

When the processing in said step S816 comes to an end, or if it is decided in step S809 that it is without conversation, then in step S817, by means of image display means 314, the image data drawn to image memory 405 is output to monitor 18, thereby displaying said image data on the screen of monitor 18. Then, in step S818, after updating the value of index register "p" by "+1", one returns to the processing beginning at step S805 in FIG. 36.

Figure 38:
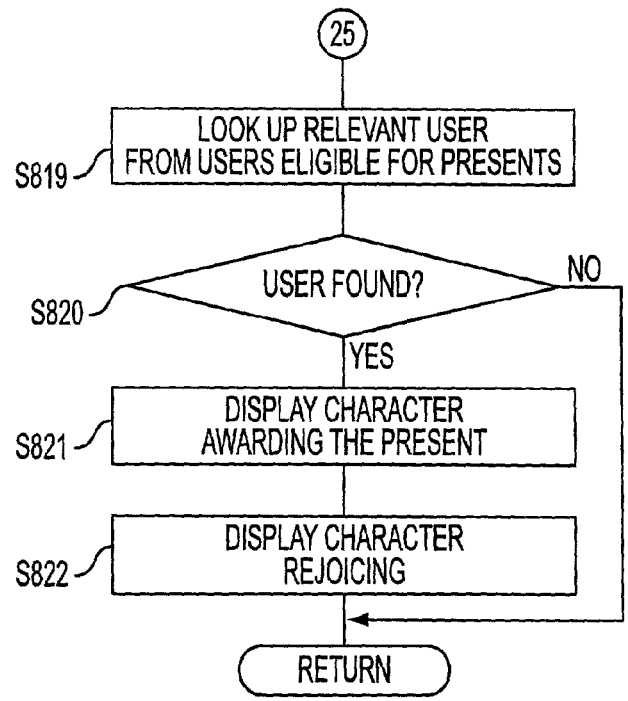
FIG. 38 is the third part of a flowchart showing the processing operation of the present processing means.

In said step S806, if it is decided that it is without movement data, one proceeds to step S819 in FIG. 38 and looks up said user from among the users eligible for presents this time. Specifically, one looks up one's own user ID from among the user IDs of users eligible for presents.

Figure 39:
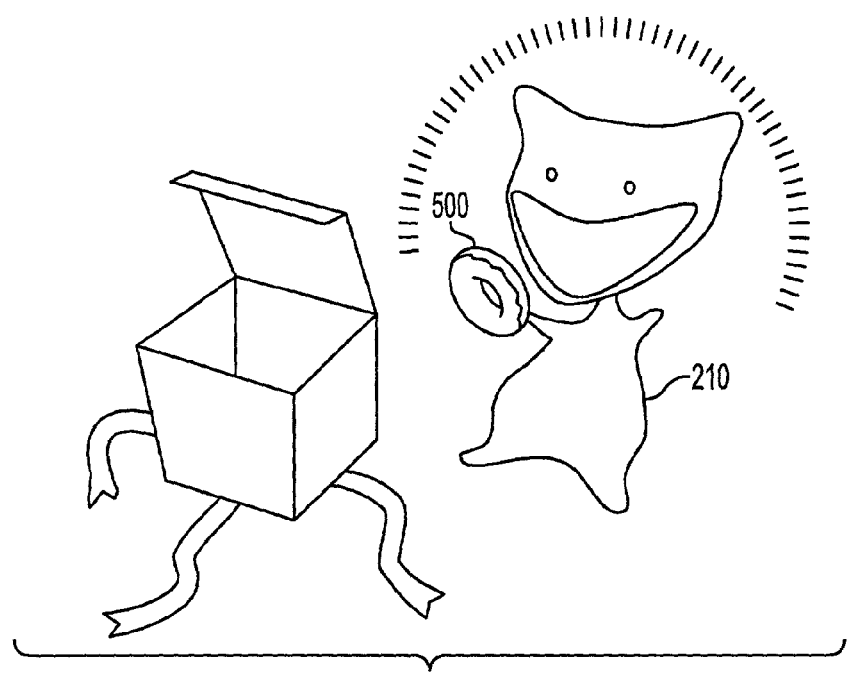
FIG. 39 is an explanatory diagram showing an example of the display of a state in which a character rejoices.

Next, in step S820, it is decided whether said user is there. That is, it is decided whether there has been a presentation of a present to oneself. If there has been a presentation of a present to oneself, a display of giving a present to a character is made on the screen of monitor 18, then, in step S822, a display is made showing the character 210 that has obtained present 500 rejoicing, for example as shown in FIG. 39.

There is an advantage that by the user himself seeing how character 210, that provides various information to the user himself, rejoices upon receiving present 500, a feeling of affinity with character 210 wells up, and this serves as motivation for submitting contributions. When the processing in said step S822 ends, or if in said step S820 it is decided that oneself is not eligible to be awarded a present, processing by this present processing means 312 ends.

We return to the description of the routine in FIG. 33. If in said step S509 the selected item is judged not to be "4. Present information", one proceeds to step S511 and performs other processing corresponding to the operation input.

Submenu processing ends when the processing in said step S505, step S508, step S510, or step S511 ends.

We return to the description of the main routine in FIG. 24. When the processing in said step S109 or step S110 ends, one proceeds to the next step S111, and it is decided whether there is a program termination request (power cutoff or forcible termination, etc.) to this program processing means 300. If there is no program termination request, one returns to aforesaid step S101 and repeats the processing beginning with said step S101. And upon a program termination request, the processing by this program processing means 300 comes to an end.

Thus, in communication system 100 of the present invention, entertainment system 10 installed at each user receives from server 104, by means of first access processing means 302, information for constituting at least a series of programs (program information file 200).

On each user's side, upon termination of processing by said first access processing means 302, the connection with server is interrupted, and a series of programs is constituted based on received program information files 200 and is displayed on monitor 18.

Each user can be informed of the content of the contribution submitted by each user by means of the lines of dialog or placards, etc. of the various characters that appear in the series of programs that appear displayed on monitor 18.

And each user, if he has information that he wants to contribute, can transfer this information to server 104 via second access processing means 310 either while a series of programs is continuing or after it has ended. Of course, when second access processing means 310 ends, the connection with server 104 is interrupted.

In this way, in communication system 100 of the present invention, one can build a new mode of program distribution using a network in which one can confirm contributed information from users that is gathered by server 104 with the connection with server 104 interrupted and by means of a program in which various characters appear.

In particular, because said series of programs is made to consist of multiple sequences having two or more time widths, said series of programs is rich in variety, which can prevent the user from becoming bored. Moreover, if one uses sequences that have continuity with each other, one can realize it as a fixed program.

As the information that comprises said series of programs (program information files 200), one may have at least instruction information (character information CI) that indicates movement data that includes the conversation output of characters that appear in the multiple sequences constituting said series of programs, the order of said multiple sequences, and contributed information from users. Because all this information can be constituted as text data, the transfer speed can be improved. Moreover, if it is set up so that one transfers only the changed parts, the transfer speed can be raised even further, with the result that one can shorten the time needed for loading said program information files 200 by first access processing means 302.

Also, program processing means 300 relating to this embodiment has program production means 320, which produces a series of programs based on information (program information files 200) from server 104 by first access processing means 302, and program display means (program drawing means 322 and image display means 314), which output on monitor 18 the program produced by said program production means 320. In particular, the program display means display opening images during loading processing by first access processing means 302 and display said series of programs when at least said loading processing has ended.

In this way, the user can naturally have empathy for the program without being aware of the loading processing of program information files 200 by entertainment system 10. Thus the irritation of waiting through said loading processing can be eliminated. And contributed information (sequence numbers and contributed texts) that is input at an appropriate time during a program or after a program has ended is transferred to server 104 via second access processing means 310.

Thus, in embodiment of the present invention, in a program composition in which access to server 104 is a mandatory element, the user is allowed to enjoy the program without being made aware of this access, and in this way he can be made to contribute to the promotion of the development of new program compositions.

Communication system 100 of the present embodiment transmits program information files 200 from server 104 to each user's entertainment system 10, and outputs to monitor 18 of entertainment system 10 a program constituted by the information registered in said program information files 200 and the information held in entertainment system 10. Thus, information that is mainly text data is transmitted from server 104 to each user, and a program can be constituted by combining, for example, image data with said information at each user. Because of this, the transfer speed from server 104 to each user can be increased, thereby eliminating the user's long wait for information sent from server 104. As a result, the effect can be obtained that the popularization of program distribution using network 102 is encouraged.

Also, in supplying programs consisting of information registered in program information files 200 transmitted from server 104 to each user's entertainment system 10 and information held in said entertainment system 10, the present embodiment has processing that produces object data of multiple characters to be displayed on monitor 18 of entertainment system 10 installed at each user, processing that produces movement data for each sequence of multiple characters that appear in the multiple sequences, and processing that records on optical disk 20 distributed to each user the object data of these produced multiple characters and movement data for each sequence.

In this way, first, the object data of multiple characters is produced, and movement data for each sequence of multiple characters that appear in multiple sequences is produced. The produced said multiple characters' object data and movement data for each sequence is recorded on optical disk 20 that is distributed to each user.

Said optical disk 20 is distributed to each user and is installed on each user's entertainment system 10. That is, at this stage, the information recorded on optical disk 20 is held in entertainment system 10.

In other words, large-data-quantity character object data and movement data are held in each user's entertainment system 10, and in this way it becomes possible to transmit to each user from server 104 information that is mainly text data. Because of this, the transfer speed from server 104 to each user's entertainment system 10 can be increased, thereby eliminating the user's long wait for information sent from server 104. As a result, the effect can be obtained that the popularization of program distribution over network 102 is encouraged. Also, a program is constituted by combining information transmitted from server 104 to each user and information that is held in entertainment system 10.

Also, in the supply of said program information, it has processing that produces multiple background image data BGD to be displayed in the multiple sequences that constitute said program, and processing that records on said optical disk 20 background image data BGD selected from the produced multiple background image data BGD.

In this way, in a specified program, the background image can be changed according to various commemorative days, etc. if background image data BGD to which a change is to be made on various commemorative days, etc. is stored on server 104 and the background image data BGD that corresponds to the time is transmitted from server 104 to each user's entertainment system 10. Because of this, the user can enjoy a program while being aware of a seasonal feeling or the existence of a commemorative day. And because the background image data BGD for different seasons does not change frequently, it may be held in each user's entertainment system 10.

And because background image data BGD unrelated to seasons or commemorative days can be recorded on said optical disk 20, there is no need to transmit all the background image data BGD, and it is possible to suppress the prolongation of transfer time caused by the transmission of background image data BGD.

Also, in editing program information, that is, in editing a program consisting of information registered in program information files 200 transmitted from server 104 to each user's entertainment system 10 and information held in entertainment system 10, the embodiment of the present invention has processing that determines the combination of multiple sequences that constitute said program and registers information on the sequences relating to this combination in program information files 200, processing that selects contributed texts sent from each user and extracts the contributed text to be announced in each sequence, and processing that registers the extracted contributed texts in the information of the sequence that corresponds to said contributed texts among the information of the multiple sequences registered in said program information files 200.

In this way, the multiple sequences that constitute the program are determined on the server 104 side, information concerning these sequences is then registered in program information files 200, and in addition, the contributed texts to be announced are extracted from the contributed texts sent from the users, and these texts to be announced are registered in the corresponding sequence information.

The program information files 200 in which the various information is registered as described above are transmitted from server 104 to each user's entertainment system 10. At each user's entertainment system 10, the program is composed and displayed on monitor 18 based on information concerning sequences registered in the received program information files 200, and in each sequence the corresponding contributed text is displayed.

In particular, in the present embodiment, when registering said extracted contributed texts in the information of the sequence that corresponds thereto, the feeling that can be judged from said contributed text may be made into flag information (feelings flag FFL) and registered together with said contributed text.

In this way, when announcing a contributed text at each user, it is possible to announce it together with the feeling based on feelings flag FFL. That is, rather than simply presenting a contributed text, if the contributed text is for example of a happy content, it is possible for example to make a sequence content in which the characters that appear in the sequence present contributed texts enjoyably, and thus one can put together a program that one does not grow tired of. Also, the user can be made more aware of the contributions, thus encouraging the submission of contributions.

Of course, the communication system, computer program execution device, recording medium, computer program, program information supply method, and program information editing method of this invention are not limited to the above embodiment, and various other compositions may be adopted.

As described above, the communication system, computer program execution device, recording medium, and computer program of this invention make it possible to confirm contributed information from users collected in a server in a state where the connection with the server is interrupted and via a program in which various characters appear, thereby making it possible to build a new program distribution mode using a network.

Also, the method for supplying program information and the program information editing method of this invention make it possible to build a new program distribution mode using a network.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. A user operated computer program execution device connectable to a server via a network and having at least a display device, wherein a performance information file includes sequence information that constitutes a performance and flag information that defines movements or expressions of characters that appear in the sequence information, the user operated computer program execution device comprising:

means for processing movement data files stored in the user operated computer program execution device, the movement data files including movement data corresponding to the flag information;

means for receiving from the server the performance information file by the computer program execution device;

means for composing the performance by selecting from the movement data the data that corresponds to the flag information registered on the performance information file to define the movements and expressions of characters and utilizing the sequence information to order the movement data; and program display means for displaying the composed performance on the display device.

2. A communication system having a network, a server, and an entertainment system connectable to the server via the network wherein a performance information file includes sequence information that constitutes a performance and flag information that defines movements or expressions of characters that appear in the sequence information, the entertainment system comprising:

means for processing movement data files stored in a computer of the entertainment system, the movement data files including movement data corresponding to the flag information;

means for receiving from the server the performance information file by the computer;

means for composing the performance by selecting from the movement data the data that corresponds to the flag information registered on the performance information file to define the movements and expressions of characters and utilizing the sequence information to order the movement data; and program display means for displaying the composed performance on a display device of the entertainment system.

3. The communication system of claim 2, wherein the entertainment system is adapted to transmit contributed texts of users to the server.

4. The communication system of claim 2, wherein the entertainment system is adapted to display an opening image on the display means during a reception of the performance information file from the server, and displaying the series of the performances after the reception of the performance information file is completed.

5. A user operated computer program execution device connectable to a server via a network, comprising:

means for processing movement data files stored in the user operated computer program execution device, the movement data file including movement data corresponding to the flag information;

means for receiving from the server a performance information file by the computer program execution device;

means for composing a performance by selecting from the movement data the data that corresponds to the flag information registered on the performance information file to define the movements and expressions of characters and utilizing the sequence information to order the movement data; and program display means for displaying the composed performance on a display device of the computer program execution device;

wherein the performance information file includes the sequence information that constitutes the performance and the flag information that defines movements or expressions of characters that appear in the sequence information.

* * * * *